United States Patent
Yukawa et al.

(10) Patent No.: US 8,404,354 B2
(45) Date of Patent: Mar. 26, 2013

(54) WATER-BASED PAINT COMPOSITIONS

(75) Inventors: Yoshiyuki Yukawa, Hiratsuka (JP); Takashi Tanaka, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 762 days.

(21) Appl. No.: 12/309,650

(22) PCT Filed: Jul. 23, 2007

(86) PCT No.: PCT/JP2007/064824
§ 371 (c)(1), (2), (4) Date: Jan. 26, 2009

(87) PCT Pub. No.: WO2008/013290
PCT Pub. Date: Jan. 31, 2008

(65) Prior Publication Data
US 2009/0191419 A1   Jul. 30, 2009

(30) Foreign Application Priority Data

Jul. 25, 2006 (JP) .................................. 2006-202589
Jul. 25, 2006 (JP) .................................. 2006-202606

(51) Int. Cl.
*C08G 63/48* (2006.01)
*C08L 51/00* (2006.01)
*B32B 27/30* (2006.01)

(52) U.S. Cl. .......... 428/522; 428/523; 525/64; 525/185; 525/186; 525/190

(58) Field of Classification Search .......... None
See application file for complete search history.

(56) References Cited

U.S. PATENT DOCUMENTS

| 4,900,774 A | 2/1990 | Mitsuji et al. |
| 5,539,049 A | 7/1996 | Kajima et al. |
| 2002/0077411 A1 | 6/2002 | Nakajima et al. |
| 2003/0125414 A1 | 7/2003 | Nakajima et al. |
| 2003/0236324 A1 | 12/2003 | Yukawa et al. |
| 2006/0135651 A1* | 6/2006 | Nakane et al. ......... 523/201 |

FOREIGN PATENT DOCUMENTS

| JP | 55-155007 | 12/1980 |
| JP | 63-193968 | 8/1988 |
| JP | 2-47175 | 2/1990 |
| JP | 7-41729 | 2/1995 |
| JP | 10-306236 | 11/1998 |
| JP | 2000-204285 | 7/2000 |
| JP | 2002-194037 | 7/2002 |
| JP | 2002-206013 | 7/2002 |
| JP | 2002-308993 | 10/2002 |
| JP | 2003-292884 | 10/2003 |
| JP | 2004-2758 | 1/2004 |
| JP | 2006-176618 | 7/2006 |
| WO | 02/31010 | 4/2002 |

OTHER PUBLICATIONS

Machine tranlastion of JP 2003-292884.*
English translation of PCT Written Opinion dated Feb. 5, 2009 in International Application No. PCT/JP2007/064824.
International Search Report dated Oct. 16, 2007 in the International (PCT) Application PCT/JP2007/064824 of which the present application is the U.S. National Stage.

* cited by examiner

*Primary Examiner* — Ana Woodward
(74) *Attorney, Agent, or Firm* — Wenderoth, Lind & Ponack, L.L.P.

(57) ABSTRACT

The invention discloses water-based paint compositions which comprise a copolymer of polymerizable unsaturated monomer having polyoxyalkylene chain; hydroxyl-containing polymerizable unsaturated monomer having no polyoxyalkylene chain; polymerizable unsaturated monomer having at least one cationic functional group selected from the group consisting of tertiary amino groups and quaternary ammonium salt groups; at least one monomer selected from the group consisting of bridged alicyclic hydrocarbon group-containing polymerizable unsaturated monomers and $C_{6-18}$ alkyl group-containing polymerizable unsaturated monomers; and other polymerizable unsaturated monomer: a hydroxyl-containing resin: and a melamine resin having a weight-average molecular weight within the range of 1,000-5,000. The invention also discloses film-forming methods using the compositions.

19 Claims, No Drawings

WATER-BASED PAINT COMPOSITIONS

TECHNICAL FIELD

This invention relates to water-based paint compositions and coating film-forming methods using the same.

BACKGROUND ART

As intermediate paint, top paint and the like for outer panels of automobiles, heretofore water-based paint comprising a base resin such as acrylic resin, polyester resin and the like which contain functional groups such as hydroxyl or carboxyl groups; and melamine resin as a crosslinking agent has been frequently used.

As the melamine resin, water-soluble melamine resins of relatively low molecular weight which excel in dispersibility in water have been predominantly used, but recently investigations are made for use of hydrophobic melamine resins of relatively high molecular weight. While water-based paints containing such hydrophobic melamine resins exhibit higher coating film performance such as water resistance, compared to water-based paints containing water-soluble melamine resins, they have a problem that the films they form occasionally are inferior in smoothness or distinctness of image, due to low compatibility between the hydrophobic melamine resins with water which serves as the medium.

JP 2002-308993A discloses that aqueous resin dispersions containing the reaction product obtained by heat-treating specific acrylic resin, hydrophobic melamine resin and polyester resin under specific conditions show good dispersibility in water and can form coating film of excellent appearance. However, such aqueous resin dispersions are disadvantageous in respect of energy saving because the heating step is required at their production time, and furthermore coating films they form are in cases inferior in smoothness.

JP Sho 63 (1988)-193968A discloses that water-based coating compositions, which contain a crosslinking agent formed by dispersing hydrophobic melamine resin in water in the presence of a water-soluble resin, can be advantageously utilized as water-based base coat paint compositions which show excellent storage stability, can form coating films free of such defects as sagging and unevenness, and have good coating workability. However, coating films formed of the water-based coating compositions occasionally are inferior in smoothness and distinctness of image.

JP Hei 7 (1995)-41729A discloses aqueous resin dispersions formed by dispersing a graft resin having a weight-average molecular weight of 5,000-50,000, an acid value greater than 20 and hydrophilic side chains, and a hydrophobic melamine resin in an aqueous medium, excel in storage stability, heat stability, mechanical stability and so on. However, coating films formed with use of the water-based paint compositions containing the aqueous resin dispersions are inferior in smoothness and distinctness of image in certain occasions.

DISCLOSURE OF THE INVENTION

The main object of the present invention is to offer water-based paint compositions which contain high molecular weight melamine resin and are capable of forming coating film excelling in smoothness, distinctness of image and water resistance, and also the methods for forming coating film using the same.

We have engaged in concentrative studies with the view to accomplish the above object, to now discover that water-based paint compositions which form coating film excelling in smoothness, distinctness of image and water resistance could be obtained by having water-based paint, which comprises hydroxyl-containing resin as the base resin and high molecular weight melamine resin as the crosslinking agent, contain a copolymer of polymerizable unsaturated monomer having polyoxyalkylene chain, hydroxyl-containing polymerizable unsaturated monomer having no polyoxyalkylene chain, polymerizable unsaturated monomer containing at least one cationic functional group selected from the group consisting of tertiary amino groups and quaternary ammonium salt groups, at least one polymerizable unsaturated monomer selected from the group consisting of bridged alicyclic hydrocarbon group-containing polymerizable unsaturated monomers and $C_{6-18}$ alkyl group-containing polymerizable unsaturated monomers, and polymerizable unsaturated monomer other than the foregoing. The present invention is whereupon completed.

Thus, the present invention provides water-based paint compositions which are characterized by comprising (A) a copolymer of (a) polymerizable unsaturated monomer having polyoxyalkylene chain, (b) hydroxyl-containing polymerizable unsaturated monomer having no polyoxyalkylene chain, (c) polymerizable unsaturated monomer having at least one cationic functional group selected from the group consisting of tertiary amino groups and quaternary ammonium salt groups, (d) at least one monomer selected from the group consisting of (d-1) bridged alicyclic hydrocarbon group-containing polymerizable unsaturated monomers and (d-2) $C_{6-18}$ (cyclo)alkyl group-containing polymerizable unsaturated monomers and (e) other polymerizable unsaturated monomer, (B) hydroxyl-containing resin, and (C) melamine resin having a weight-average molecular weight within the range of 1,000-5,000.

The water-based paint compositions according to the present invention can form coating film of excellent smoothness, distinctness of image and water resistance.

The reason why the water-based paint compositions of the present invention can form coating film of excellent smoothness, distinctness of image and water resistance is not precisely clear, but it can be inferred that the copolymer (A) improves compatibility of the high molecular weight melamine resin (C) with water, allowing in consequence the water-based paint compositions of the invention to exhibit excellent smoothness and distinctness of image and also that the crosslinked structure formed by the reaction of hydroxyl groups in the copolymer (A) and hydroxyl-containing resin (B) with the high molecular weight melamine resin (C) exhibits excellent water resistance.

Hereinafter the water-based paint compositions of the present invention are explained in further details.

Copolymer (A)

The copolymer (A) used in the water-based paint compositions of the invention is a copolymer having the recurring units derived from a copolymer of (a) polymerizable unsaturated monomer having polyoxyalkylene chain, (b) hydroxyl-containing polymerizable unsaturated monomer having no polyoxyalkylene chain, (c) polymerizable unsaturated monomer having at least one cationic functional group selected from the group consisting of tertiary amino groups and quaternary ammonium salt groups, (d) at least one monomer selected from the group consisting of (d-1) bridged alicyclic hydrocarbon group-containing polymerizable unsaturated monomers and (d-2) $C_{6-18}$ (cyclo)alkyl group-containing polymerizable unsaturated monomers and (e) other polymerizable unsaturated monomer, which are explained hereinbelow.

Polymerizable Unsaturated Monomer (a) Having Polyoxyalkylene Chain

The polymerizable unsaturated monomer (a) having polyoxyalkylene chain is the monomeric component to impart hydrophilicity to the copolymer (A) to be formed, and contains a polyoxyalkylene chain and a polymerizable unsaturated group per molecule.

As the polyoxyalkylene chain, for example, polyoxyethylene chain, polyoxypropylene chain, chains formed of polyoxyethylene block(s) and polyoxypropylene block(s) and the like can be named. These polyoxyalkylene chains preferably have a molecular weight within the range of generally 200-5,000, in particular, 250-3,500, inter alia, 300-2,500.

As typical examples of the polymerizable unsaturated monomer (a) having such polyoxyalkylene chain, for example, those compounds represented by a general formula (1)

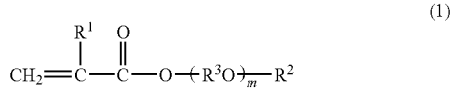

[in the formula, $R^1$ stands for hydrogen or methyl, $R^2$ stands for hydrogen or $C_{1-4}$ alkyl, $R^3$ stands for $C_{2-4}$ alkylene, m is an integer of 3-150, preferably 10-80, inter alia, 25-50, and m oxyalkylene units ($R^3O$)s may be the same or different]
can be named.

Specific examples of the compounds of above formula (1) include tetraethylene glycol (meth)acrylate, methoxytetraethylene glycol (meth)acrylate, ethoxytetraethylene glycol (meth)acrylate, n-butoxytetraethylene glycol (meth)acrylate, tetrapropylene glycol (meth)acrylate, methoxytetrapropylene glycol (meth)acrylate, ethoxytetrapropylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate, ethoxypolyethylene glycol (meth)acrylate and the like, which can be used either alone or in combination of two or more. Of those, polyethylene glycol (meth)acrylate, polypropylene glycol (meth)acrylate, methoxypolyethylene glycol (meth)acrylate and ethoxypolyethylene glycol (meth)acrylate are preferred, methoxypolyethylene glycol (meth)acrylate and ethoxypolyethylene glycol (meth)acrylate being particularly preferred.

In the present specification, "(meth)acrylate" collectively refers to acrylate and methacrylate.

The polymerizable unsaturated monomer (a) having polyoxyalkylene chain preferably has a molecular weight within the range of generally 200-7,000, in particular, 500-3,000, inter alia, 1,200-2,500.

From the viewpoint of smoothness, distinctness of image and water resistance of the formed coating film, the polymerizable unsaturated monomer (a) having polyoxyalkylene chain is preferably used within the range of generally 5-40 mass %, in particular, 7-35 mass %, inter alia, 10-30 mass %, based on the total amount of the monomers (a)-(e).

Hydroxyl-Containing Polymerizable Unsaturated Monomer (b) Having No Polyoxyalkylene Chain The hydroxyl-containing polymerizable unsaturated monomer (b) having no polyoxyalkylene chain is a polymerizable unsaturated monomer having at least one hydroxyl group per molecule, other than the polymerizable unsaturated monomer (a) having polyoxyalkylene chain.

Examples of the hydroxyl-containing polymerizable unsaturated monomer (b) having no polyoxyalkylene chain include monoesters of (meth)acrylic acid with $C_{2-8}$ dihydric alcohols, such as 2-hydroxyethyl (meth)acrylate, 2-hydroxypropyl (meth)acrylate, 3-hydroxypropyl (meth)acrylate, 4-hydroxybutyl (meth)acrylate and the like; ε-caprolactone-modified monoesters of (meth)acrylic acid with $C_{2-8}$ dihydric alcohols; and allyl alcohol, which can be used either alone or in combinations of two or more.

As the monomer (b), 2-hydroxyethyl (meth)acrylate, 2-hydroxypropyl (meth)acrylate, 3-hydroxypropyl (meth)acrylate and 4-hydroxybutyl (meth)acrylate are preferred, 4-hydroxybutyl (meth)acrylate being particularly preferred among these.

From the viewpoint of smoothness, distinctness of image and water resistance of the formed coating film, it is preferred to use the hydroxyl-containing polymerizable unsaturated monomer (b) having no polyoxyalkylene chain within the range of generally 5-40 mass %, in particular, 7-35 mass %, inter alia, 10-30 mass %, based on the total amount of the monomers (a)-(e).

Cationic Functional Group-Containing Polymerizable Unsaturated Monomer (c)

As the cationic functional group-containing polymerizable unsaturated monomer (c), polymerizable unsaturated monomer(s) containing at least one cationic functional group selected from the group consisting of tertiary amino groups and quaternary ammonium salt groups per molecule can be used.

Specific examples of tertiary amino group-containing polymerizable unsaturated monomer (c-1) include N,N-dialkylaminoalkyl (meth)acrylates such as N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, and N,N-dimethylaminobutyl (meth)acrylate; and N,N-dialkylaminoalkyl (meth)acrylamides such as N,N-dimethylaminoethyl (meth)acrylamide, N,N-diethylaminoethyl (meth)acrylamide and N,N-dimethylaminopropyl (meth)acrylamide, among which N,N-dimethylaminoethyl (meth)acrylate and N,N-diethylaminoethyl (meth)acrylate are preferred. In the specification, "(meth)acrylamide" collectively refers to acrylamide and methacrylamide.

Specific examples of quaternary ammonium salt group-containing polymerizable unsaturated monomer (c-2) include (meth)acryloyloxyalkyltrialkylammonium salts such as 2-(methacryloyloxy)ethyltrimethylammonium chloride, 2-(methacryloyloxy)ethyltrimethylammonium bromide, 2-(methacryloyloxy)ethyltrimethylammonium dimethylphosphate and the like; and (meth)acryloylaminoalkyltrialkyl ammonium salts such as methacryloylaminopropyltrimethylammonium chloride, methacryloylaminopropyltrimethylammonium bromide and the like. In particular, 2-(methacryloyloxy)ethyltrimethylammonium chloride is preferred.

In the present invention, such tertiary amino group-containing polymerizable unsaturated monomer (c-1) and quaternary ammonium salt group-containing polymerizable unsaturated monomer (c-2) can be used as the cationic functional group-containing polymerizable unsaturated monomer (c), each either alone or in combination of two or more. From the viewpoint of smoothness, distinctness of image and so on the formed coating film, it is preferred to use tertiary amino group-containing polymerizable unsaturated monomer (c-1), in particular, to concurrently use the tertiary amino group-containing polymerizable unsaturated monomer (c-1) and quaternary ammonium salt group-containing polymerizable unsaturated monomer (c-2).

Where a tertiary amino group-containing polymerizable unsaturated monomer (c-1) and a quaternary ammonium salt group-containing polymerizable unsaturated monomer (c-2) are concurrently used, it is preferred to use N,N-dimethylaminoethyl (meth)acrylate or N,N-diethylaminoethyl (meth)acrylate as the tertiary amino group-containing polymerizable unsaturated monomer (c-1), and 2-(methacryloyloxy) ethyltrimethylammonium chloride as the quaternary ammonium salt group-containing polymerizable unsaturated monomer (c-2).

When the tertiary amino group-containing polymerizable unsaturated monomer (c-1) and quaternary ammonium salt group-containing polymerizable unsaturated monomer (c-2) are concurrently used, the use ratio of the two monomers is preferably within the range of normally 20/1-1/10, in particular, 15/1-1/7.5, inter alia, 10/1-1/5, by mass ratio of (tertiary amino group-containing polymerizable unsaturated monomer)/(quaternary ammonium salt group-containing polymerizable unsaturated monomer).

It is preferred to use the cationic functional group-containing polymerizable unsaturated monomer (c) within the range of generally 1-15 mass %, in particular, 2-10 mass %, inter alia, 3-8 mass %, based on the total amount of the monomers (a)-(e), from the viewpoint of smoothness, distinctness of image, water resistance and so on of the formed coating film.

Polymerizable Unsaturated Monomer (d)

As polymerizable unsaturated monomer (d), at least one polymerizable unsaturated monomer selected from the group consisting of bridged alicyclic hydrocarbon group-containing polymerizable unsaturated monomers (d-1) and $C_{6-18}$ (cyclo)alkyl group-containing polymerizable unsaturated monomers (d-2) is used. In particular, preferably the polymerizable unsaturated monomer (d) contains the bridged alicyclic hydrocarbon group-containing polymerizable unsaturated monomer (d-1).

In the present specification, "(cyclo)alkyl group" collectively refers to alkyl group and cycloalkyl group.

Bridged Alicyclic Hydrocarbon Group-Containing Polymerizable Unsaturated Monomer (d-1)

Bridged alicyclic hydrocarbon group-containing polymerizable unsaturated monomer (d-1) includes the compounds having bridged alicyclic hydrocarbon group and polymerizable unsaturated group per molecule. As such bridged alicyclic hydrocarbon group-containing polymerizable unsaturated monomer (d-1), for example, isobornyl (meth)acrylate, tricyclodecanyl (meth)acrylate, adamantyl (meth)acrylate and the like can be named, which can be used either alone or in combination of two or more. In particular, isobornyl (meth)acrylate is preferred.

When the bridged alicyclic hydrocarbon group-containing polymerizable unsaturated monomer (d-1) is used as the polymerizable unsaturated monomer (d), it is preferred to use the bridged alicyclic hydrocarbon group-containing polymerizable unsaturated monomer (d-1) within the range of generally 1-50 mass %, in particular, 5-40 mass %, inter alia, 10-30 mass %, for the best result, 15-25 mass %, based on the total amount of the monomers (a)-(e), from the viewpoint of smoothness, distinctness of image, water resistance and so on.

$C_{6-18}$ (Cyclo)Alkyl Group)-Containing Polymerizable Unsaturated Monomer (d-2)

As the 8 (cyclo)alkyl group-containing polymerizable unsaturated monomer (d-2), for example, (cyclo)alkyl (meth)acrylates such as n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, Isostearyl Acrylate (tradename, Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and the like can be named, which can be used either alone or in combination of two or more. In particular, polymerizable unsaturated monomers having $C_{8-13}$ alkyl groups are preferred, of which 2-ethylhexyl (meth)acrylate and lauryl (meth)acrylate are most suitable.

When $C_{6-18}$ alkyl group-containing polymerizable unsaturated monomer (d-2) is used as the polymerizable unsaturated monomer (d), the $C_{6-18}$ alkyl group-containing polymerizable unsaturated monomer (d-2) is conveniently used within the range of generally 1-50 mass %, in particular, 5-40 mass %, inter alia, 10-30 mass %, and for the best result, 15-25 mass %, based on the total amount of the monomers (a)-(e), from the viewpoint of smoothness, distinctness of image, water resistance and so on of the formed coating film.

Other Ethylenically Unsaturated Monomer (e)

Other ethylenically unsaturated monomer (e) include polymerizable unsaturated monomers other than the above-described monomers (a)-(d), which are copolymerizable with the monomers (a)-(d).

Examples of the other ethylenically unsaturated monomer (e) include alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate and the like; vinyl aromatic compounds such as styrene, α-methylstyrene, vinyltoluene and the like; carboxyl-containing polymerizable unsaturated monomers such as (meth)acrylic acid, maleic acid, crotonic acid, β-carboxyethyl acrylate and the like; (meth)acrylonitrile, (meth)acrylamide, vinyl acetate and the like, which can be used either alone or in combination of two or more. From the viewpoint of smoothness and distinctness of image of formed coating film, it is convenient that the other polymerizable unsaturated monomer (e) is vinyl aromatic compound, in particular, styrene.

It is suitable to use the other polymerizable unsaturated monomer (e) within the range of generally 1-88 mass %, in particular, 1-79 mass %, inter alia, 1-67 mass %, based on the total amount of the monomers (a)-(e).

Furthermore, when the other polymerizable unsaturated monomer (e) contains the vinyl aromatic compound, that vinyl aromatic compound, for example, styrene, is conveniently used within the range of generally 1-40 mass %, in particular, 3-15 mass %, inter alia, 5-10 mass %, based on the total amount of the monomers (a)-(e).

Copolymer (A)

The copolymer (A) to be used in the water-based paint compositions of the present invention is obtained by copolymerizing the above-described polyoxyalkylene chain-containing polymerizable unsaturated monomer (a), hydroxyl-containing polymerizable unsaturated monomer (b) having no polyoxyalkylene chain, polymerizable unsaturated monomer (c) having at least one cationic functional group selected from the group consisting of tertiary amino groups and quaternary ammonium salt groups, at least one polymerizable unsaturated monomer (d) selected from the group consisting of bridged alicyclic hydrocarbon group-containing polymerizable unsaturated monomers (d-1) and $C_{6-18}$ alkyl group-containing polymerizable unsaturated monomers (d-2), and polymerizable unsaturated monomer (e) other than the foregoing. The use ratio of those monomers (a)-(e) in the copolymerization is not strictly limited, but is variable depending on physical properties and the like desired for the formed copolymer. Whereas, generally they can be used within the following ranges, based on the total amount of the monomers (a)-(e):

monomer (a): 5-40 mass %, preferably 7-35 mass %, inter alia, 10-30 mass %,
monomer (b): 5-40 mass %, preferably 7-35 mass %, inter alia, 10-30 mass %,
monomer (c): 1-15 mass %, preferably 2-10 mass %, inter alia, 3-8 mass %,
monomer (d): 1-50 mass %, preferably 5-40 mass %, more preferably 10-30 mass %, inter alia, 15-25 mass %,
monomer (e): 1-88 mass %, preferably 1-79 mass %, inter alia, 1-67 mass %.

The copolymerization of monomers (a)-(e) can be carried out by the means known per se, such as solution polymerization in organic solvent, emulsion polymerization in water or the like, solution polymerization being preferred among these. As the copolymerization by solution polymerization method, for example, a method comprising dissolving or dispersing a mixture of the monomers (a)-(e) with a radical polymerization initiator and heating normally at about 80° C.-about 200° C. for around 1-10 hours under stirring to effect the polymerization can be used.

As the organic solvent useful in the occasion of the copolymerization, for example, hydrocarbon solvents such as heptane, toluene, xylene, octane, mineral spirit and the like; ester solvents such as ethyl acetate, n-butyl acetate, isobutyl acetate, ethylene glycol monomethyl ether acetate, diethylene glycol monobutyl ether acetate and the like; ketone solvents such as methyl ethyl ketone, methyl isobutyl ketone, diisobutyl ketone, cyclohexanone and the like; alcoholic solvents such as methanol, ethanol, isopropanol, n-butanol, sec-butanol, isobutanol and the like; ether solvents such as n-butyl ether, dioxane, ethylene glycol monomethyl ether, ethylene glycol monoethyl ether and the like; and aromatic petroleum solvents such as SWAZOL 310, SWAZOL 1000, SWAZOL 1500 and the like of COSMO OIL Co., Ltd. can be named. These organic solvents can be used either alone or in combination of two or more. The organic solvent can be used at a ratio normally not exceeding 400 mass parts to the total amount of the monomers (a)-(e).

As the radical polymerization initiator, for example, organic peroxide polymerization initiators including ketone peroxides such as cyclohexanone peroxide, 3,3,5-trimethylcyclohexanone peroxide, methylcyclohexanone peroxide and the like; peroxyketals such as 1,1-bis(tert-butylperoxy)-3,3,5-trimethylcyclohexane, 1,1-bis(tert-butylperoxy)cyclohexane, n-butyl-4,4-bis(tert-butylperoxy)valerate and the like; hydroperoxides such as cumene hydroperoxide, 2,5-dimethylhexane-2,5-dihydroperoxide and the like; dialkyl peroxides such as 1,3-bis(tert-butylperoxy-m-isopropyl)benzene, 2,5-dimethyl-2,5-di(tert-butylperoxy)hexane, diisopropylbenzene peroxide, tert-butylcumyl peroxide and the like; diacyl peroxides such as decanoyl peroxide, lauroyl peroxide, benzoyl peroxide, 2,4-dichlorobenzoyl peroxide and the like; peroxycarbonates such as bis(tert-butylcyclohexyl)peroxydicarbonate and the like; and peroxy esters such as tert-butylperoxybenzoate, 2,5-dimethyl-2,5-di(benzoylperoxy)hexane and the like; and azo polymerization initiators such as 2,2'-azobisisobutyronitrile, 1,1-azobis(cyclohexane-1-carbonitrile), azocumene 2,2'-azobismethylvaleronitrile, 4,4'-azobis (4-cyanovaleric acid) and the like can be named. The use amount of these radical polymerization initiators is not particularly limited, but it is normally desirable that it falls within the range of 0.1-15 mass parts, in particular, 0.3-10 mass parts, per 100 mass parts in total of the monomers (a)-(e).

In the polymerization reaction, method of adding the monomer components or the polymerization initiator is not particularly limited, but the polymerization initiator is added dropwise plural times as divided into several portions, over the period from initial stage of the polymerization to the late stage, rather than feeding it in lump at the initial stage of the polymerization, for convenient temperature control during the polymerization reaction and suppressing formation of unnecessary crosslinked matter such as gel.

Molecular weight of so obtained copolymer (A) is not particularly limited, but from the viewpoints of dispersibility in water and smoothness of formed coating film, its weight-average molecular weight preferably lies within the range of generally 500-100,000, in particular, 1,000-70,000, inter alia, 3,000-50,000.

It is also convenient that the copolymer (A) has a hydroxyl value within the range of normally 10-150 mgKOH/g, in particular, 30-100 mgKOH/g, inter alia, 50-90 mgKOH/g, from the viewpoint of water resistance of formed coating film.

The copolymer (A) can be made water-dispersible or water-soluble, by neutralization with an acidic neutralizer. As the acidic neutralizer, for example, phosphoric acid, sulfonic acid, formic acid, acetic acid, propionic acid, n-butanoic acid, n-pentanoic acid, n-hexanoic acid, lactic acid, malic acid, citric acid and the like can be named. Of these, lactic acid can be conveniently used. Those acidic neutralizers can be used either alone or in combination of two or more.

(B) Hydroxyl-Containing Resin

The hydroxyl-containing resin (B) to be used in the paint compositions of the present invention includes resins having at least one hydroxyl group per molecule, specific examples being polyester resin, acrylic resin, polyether resin, polycarbonate resin, urethane resin and the like, which contain hydroxyl groups and where necessary, further contain carboxyl groups. Of these, use of hydroxyl-containing acrylic resin (B-1) and/or hydroxyl-containing polyester resin (B-2) is preferred.

It is permissible that a part each of the hydroxyl-containing acrylic resin (B-1) and hydroxyl-containing polyester resin (B-2) is replaced by the resins in which polyisocyanate compound is extended at a part of their hydroxyl groups by urethanation reaction to increase their molecular weight. Such resins are referred to as urethane-modified acrylic resin or urethane-modified polyester resin.

The hydroxyl-containing acrylic resin (B-1) can be produced by (co)polymerizing hydroxyl-containing polymerizable unsaturated monomer (f) hereafter explained, where necessary, with other polymerizable unsaturated monomer (g) which is copolymerizable therewith, by the means known per se, such as solution polymerization in organic solvent or emulsion polymerization in water.

Hydroxyl-containing polymerizable unsaturated monomer (f) is a compound having at least one each of hydroxyl group and polymerizable unsaturated bond per molecule, examples of which include monoesters of (meth)acrylic acid with $C_{2-8}$ dihydric alcohols, such as 2-hydroxyethyl (meth)acrylate, 2-hydroxypropyl (meth)acrylate, 3-hydroxypropyl (meth) acrylate, 4-hydroxybutyl (meth)acrylate and the like; ε-caprolactone-modified monoesters of (meth)acrylic acid with $C_{2-8}$ dihydric alcohols; allyl alcohol, and, furthermore, (meth)acrylates having hydroxyl-terminated polyoxyethylene chain.

Examples of the other polymerizable unsaturated monomer (g) which is copolymerizable with the hydroxyl-containing polymerizable unsaturated monomer (f) include (cyclo) alkyl (meth)acrylates such as methyl (meth)acrylate, ethyl (meth)acrylate, n-propyl (meth)acrylate, i-propyl (meth) acrylate, n-butyl (meth)acrylate, i-butyl (meth)acrylate, tert-butyl (meth)acrylate, n-hexyl (meth)acrylate, n-octyl (meth) acrylate, 2-ethylhexyl (meth)acrylate, nonyl (meth)acrylate, tridecyl (meth)acrylate, lauryl (meth)acrylate, stearyl (meth) acrylate, Isostearyl Acrylate (tradename Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and the like; polymerizable unsaturated monomers having isobornyl group such as isobornyl (meth)acrylate; polymerizable unsaturated monomers having adamantyl group such as adamantyl (meth)acrylate; vinyl aromatic compounds such as styrene, α-methylstyrene, vinyltoluene and the like; polymerizable unsaturated monomers having alkoxysilyl group such as vinyltrimethoxysilane, vinyltriethoxysilane, vinyltris(2-methoxyethoxy)silane, γ-(meth)acryloyloxypropyltrimethoxysilane, γ-(meth) acryloyloxypropyltriethoxysilane and the like; perfluoroalkyl (meth)acrylates such as perfluorobutylethyl (meth)acrylate, perfluorooctylethyl (meth)acrylate and the like; polymerizable unsaturated monomers having fluorinated alkyl group such as fluoroolefin; polymerizable unsaturated monomers having photo-polymerizable functional group like maleimide group; vinyl compounds such as N-vinylpyrrolidone, ethylene, butadiene, chloroprene, vinyl propionate, vinyl acetate and the like; carboxyl-containing polymerizable unsaturated monomers such as (meth)acrylic acid, maleic acid, crotonic acid, β-carboxyethyl acrylate and the like; nitrogen-containing polymerizable unsaturated monomers such as (meth) acrylonitrile, (meth)acrylamide, dimethylaminopropyl (meth)acrylamide, dimethylaminoethyl (meth)acrylate, addition products of glycidyl (meth)acrylate with amines and the like; epoxy-containing polymerizable unsaturated monomers such as glycidyl (meth)acrylate, β-methylglycidyl (meth) acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like; (meth)acrylates having alkoxy-terminated polyoxyethylene chain; sulfonic acid group-containing polymerizable unsaturated monomers such as 2-acrylamido-2-methylpropanesulfonic acid, allylsulfonic acid, sodium salt of styrenesulfonic acid, sulfoethyl methacrylate and sodium salts or ammonium salts thereof and the like; phosphoric acid group-containing polymerizable unsaturated monomers such as 2-acryloyloxyethyl acid phosphate, 2-methacryloyloxyethyl acid phosphate, 2-acryloyloxypropyl acid phosphate, 2-methacryloyloxypropyl acid phosphate and the like; polymerizable unsaturated monomers having UV absorbing functional group such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy) benzophenone, 2-(2'-hydroxy-5'-methacryloyloxyethylphenyl)-2H-benzotriazole and the like; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like; and carbonyl group-containing polymerizable unsaturated monomers such as acrolein, diacetoneacrylamide, diacetonmethacrylamide, acetoacetoxyethyl methacrylate, formylstyrol, $C_{4-7}$ vinyl alkyl ketones (e.g., vinyl methyl ketone, vinyl ethyl ketone, vinyl butyl ketone) and the like. These can be used either alone or in combination of two or more.

Hydroxyl-containing acrylic resin (B-1) preferably contains amido groups, and such hydroxyl-containing acrylic resin having amido groups can be produced, for example, by using as at least a part of the other polymerizable unsaturated monomer (g) which is copolymerizable with hydroxyl-containing polymerizable unsaturated monomer (f), an amido group-containing polymerizable unsaturated monomer such as (meth)acrylamide, dimethylaminopropyl (meth)acrylamide and the like.

The hydroxyl-containing polymerizable unsaturated monomer (f) can be used within the range of normally 1-50 mass %, preferably 2-40 mass %, inter alia, 3-30 mass %, based on the total amount of the monomer (f) and monomer (g).

From the viewpoint of storage stability and water resistance of formed coating film, the hydroxyl-containing acrylic resin (B-1) preferably has an acid value within the range of normally 0.1-200 mgKOH/g, in particular, 2-150 mgKOH/g, inter alia, 5-100 mgKOH/g.

Also from the viewpoint of water resistance of formed coating film, the hydroxyl-containing acrylic resin (B-1) preferably has a hydroxyl value within the range of normally 0.1-200 mgKOH/g, in particular, 2-150 mgKOH/g, inter alia, 5-100 mgKOH/g.

Furthermore, it is convenient for the hydroxyl-containing acrylic resin (B-1) to have a weight-average molecular weight within the range of generally 3,000-300,000, preferably 4,000-200,000, inter alia, 6,000-150,000.

The number-average molecular weight and weight-average molecular weight in the present specification are the number-average molecular weight or weight-average molecular weight as measured with gel permeation chromatograph (HLC8120GPC, Tosoh Corporation) and converted based on the molecular weight of standard polystyrene. The measurement can be conducted using four columns of TSKgel G-4000 HXL, TSKgel G-3000 HXL, TSKgel G-2500 HXL and TSKgel G-2000 HXL (tradenames, Tosoh Corporation) under the following conditions: mobile phase, tetrahydrofuran; measuring temperature, 40° C.; flow rate, 1 mL/min. and the detector, RI.

The hydroxyl-containing resin (B) furthermore is preferably a water-dispersible acrylic resin (B-3) having core/shell type multilayer structure of which constituent components are the core of copolymer (I) obtained by copolymerizing 0.1-30 mass % of polymerizable unsaturated monomer (h) having at least two polymerizable unsaturated groups per molecule and 70-99.9 mass % of polymerizable unsaturated monomer (i) having one polymerizable unsaturated group per molecule; and the shell of copolymer (II) obtained by copolymerizing 1-35 mass % of hydroxyl-containing polymerizable unsaturated monomer (f), 5-60 mass % of hydrophobic polymerizable unsaturated monomer (j) and 5-94 mass % of polymerizable unsaturated monomer (k) other than the hydroxyl-containing polymerizable unsaturated monomer (f) and hydrophobic polymerizable unsaturated monomer (j), from the viewpoint of smoothness, distinctness of image, water resistance and so on of formed coating film.

Examples of the polymerizable unsaturated monomer (h) having at least two polymerizable unsaturated groups per molecule, which constitutes the core include allyl (meth) acrylate, ethylene glycol di(meth)acrylate, triethylene glycol di(meth)acrylate, tetraethylene glycol di(meth)acrylate, 1,3-butylene glycol di(meth)acrylate, trimethylolpropane tri (meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth) acrylate, glycerol di(meth)acrylate, 1,1,1-trishydroxymethylethane di(meth)acrylate, 1,1,1-trishydroxymethylethane tri (meth)acrylate, 1,1,1-trishydroxymethylpropane tri(meth) acrylate, triallyl isocyanurate, diallyl terephthalate and divinylbenzene. These may be used either alone or in combination of two or more. The polymerizable unsaturated monomer (h) having at least two polymerizable unsaturated groups per molecule preferably contains amido group from the viewpoint of smoothness of formed coating film, examples of such polymerizable unsaturated monomer including methylenebis (meth)acrylamide, ethylenebis(meth)acrylamide and the like.

The polymerizable unsaturated monomer (h) having at least two polymerizable unsaturated groups per molecule can be used within the range of normally 0.1-30 mass %, preferably 0.5-10 mass %, inter alia, 1-4 mass %, based on the total mass of the monomer (h) and monomer (i).

The polymerizable unsaturated monomer (i) having one polymerizable unsaturated group per molecule, which also constitutes the core, is a polymerizable unsaturated monomer copolymerizable with the polymerizable unsaturated monomer (h) having at least two polymerizable unsaturated groups per molecule, and includes those compounds having one polymerizable unsaturated group such as vinyl group, (meth) acryloyl group or the like, per molecule.

Examples of the polymerizable unsaturated monomer (i) having one polymerizable unsaturated group per molecule include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth) acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, Isostearyl Acrylate (tradename, Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and the like; isobornyl group-containing polymerizable unsaturated monomers such as isobornyl (meth)acrylate; adamantyl group-containing polymerizable unsaturated monomers such as adamantyl (meth)acrylate; vinyl aromatic compounds such as styrene, α-methylstyrene, vinyltoluene and the like; hydroxyl group-containing polymerizable unsaturated monomers such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate, 4-hydroxybutyl (meth)acrylate and the like, ε-caprolactone-modified products of the monoesters of (meth)acrylic acid with $C_{2-8}$ dihydric alcohols, allyl alcohol, (meth)acrylates having hydroxyl-terminated polyoxyethylene chain and the like; carboxyl group-containing polymerizable unsaturated monomers such as (meth)acrylic acid, maleic acid, crotonic acid, β-carboxyethyl acrylate and the like; nitrogen-containing polymerizable unsaturated monomers such as (meth)acrylonitrile, (meth)acrylamide, dimethylaminopropyl (meth)acrylamide, dimethylaminoethyl (meth)acrylate, adducts of glycidyl (meth)acrylate with amines and the like. These monomers can be used either alone or in combination of two or more.

On the other hand, as the hydroxyl-containing polymerizable unsaturated monomer (f) to constitute the shell, as aforesaid, monoesters of (meth)acrylic acid with $C_{2-8}$ dihydric alcohols, such as 2-hydroxyethyl (meth)acrylate, 2-hydroxypropyl (meth)acrylate, 3-hydroxypropyl (meth)acrylate, 4-hydroxybutyl (meth)acrylate and the like, ε-caprolactone-modified monoesters of (meth)acrylic acid with $C_{2-8}$ dihydric alcohols, allyl alcohol, (meth)acrylate having hydroxyl-terminated polyoxyethylene chain, and the like can be named. These can be used either alone or in combination of two or more.

The hydroxyl-containing polymerizable unsaturated monomer (f) can be used within the range of normally 1-35 mass %, preferably 6-25 mass %, inter alia, 11-20 mass %, based on the total mass of the monomers (f), (j) and (k).

The hydrophobic polymerizable unsaturated monomer (j) to constitute the shell include polymerizable unsaturated monomers which contain straight chain, branched or cyclic, saturated or unsaturated, at least $C_6$ hydrocarbon group. Specifically, for example, alkyl or cycloalkyl (meth)acrylates such as n-hexyl (meth)acrylate, n-octyl (meth)acrylate, 2-ethylhexyl (meth)acrylate, nonyl (meth)acrylate, tridecyl (meth) acrylate, lauryl (meth)acrylate, stearyl (meth)acrylate, Isostearyl Acrylate (tradename, Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and the like; isobornyl group-containing polymerizable unsaturated monomers such as isobornyl (meth)acrylate; adamantyl group-containing polymerizable unsaturated monomers such as adamantyl (meth) acrylate; vinyl aromatic compounds such as styrene, α-methylstyrene, vinyltoluene and the like can be named, which can be used either alone or in combination of two or more. As the hydrophobic polymerizable monomer (j) to be used for water-dispersible acrylic resin (B-3), vinyl aromatic compounds, in particular styrene, are preferred among these, from the viewpoint of smoothness, distinctness of image and so on of formed coating film.

The hydrophobic polymerizable unsaturated monomer (j) is used preferably within the range of normally 5-60 mass %, in particular, 9-40 mass %, inter alia, 15-25 mass %, based on the total amount of the monomers (f), (j) and (k).

Also as the polymerizable unsaturated monomer (k) other than the hydroxyl-containing polymerizable unsaturated monomer (f) and the hydrophobic polymerizable unsaturated monomer (j), to constitute the shell, for example, alkyl (meth) acrylate such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate and the like; and carboxyl-containing polymerizable unsaturated monomer such as (meth)acrylic acid, maleic acid, crotonic acid, β-carboxyethyl acrylate and the like can be named, which can be used either alone or in combination of two or more.

The polymerizable unsaturated monomer (k) other than the hydroxyl-containing polymerizable unsaturated monomer (f) and hydrophobic polymerizable unsaturated monomer (j) preferably contains, as at least a part thereof, carboxyl-containing polymerizable unsaturated monomer (l), for securing smoothness of formed coating film.

As the carboxyl-containing polymerizable unsaturated monomer (l), for example, (meth)acrylic acid, maleic acid, crotonic acid, β-carboxyethyl acrylate and the like can be named, among which acrylic acid and methacrylic acid are particularly preferred.

From the viewpoint of stability of the water-dispersible acrylic resin (B-3) in aqueous medium and smoothness and water resistance of formed coating film, the carboxyl-containing polymerizable unsaturated monomer (l) is preferably used within the range of normally 1-40 mass %, in particular, 6-25 mass, inter alia, 11-19 mass %, based on the total mass of the monomers (f)-(k).

From the viewpoint of water resistance of formed coating film, the water-dispersible acrylic resin (B-3) preferably has a hydroxyl value within the range of normally 1-70 mgKOH/g, in particular, 2-60 mgKOH/g, inter alia, 5-45 mgKOH/g.

Also from the viewpoint of storage stability, and water resistance of formed coating film, the water-dispersible acrylic resin (B-3) preferably has an acid value within the range of generally 5-90 mgKOH/g, in particular, 10-70 mgKOH/g, inter alia, 15-50 mgKOH/g.

It is furthermore preferred from the viewpoint of smoothness and distinctness of image of formed coating film, to use polymerizable unsaturated monomers having only one polymerizable unsaturated group per molecule as the monomers (f), (j) and (k), to render the shells of the water-dispersible acrylic resin (B-3) uncrosslinked.

The water-dispersible acrylic resin (B-3) is obtainable by, for example, emulsion polymerizing a monomer mixture (I) of 0.1-30 mass % of the polymerizable unsaturated monomer (h) having at least two polymerizable unsaturated groups per molecule and 70-99.9 mass % of the polymerizable unsaturated monomer (i) having one polymerizable unsaturated group per molecule, adding to the resultant emulsion a monomer mixture (II) of 1-35 mass % of the hydroxyl-containing polymerizable unsaturated monomer (f), 5-60 mass % of the hydrophobic polymerizable unsaturated monomer (j) and 5-94 mass % of the polymerizable unsaturated monomer (k) other than the above monomers (f) and (j), and further carrying out the polymerization.

Emulsion polymerization of the monomer mixture can be carried out by the means known per se, for example, with use of a polymerization initiator in the presence of an emulsifier.

As the emulsifier, anionic emulsifier or nonionic emulsifier are preferred. Examples of the anionic emulsifier include sodium salts or ammonium salts of alkylsulfonic acid, alkylbenzenesulfonic acid, alkylphosphoric acid and the like, and specific examples of nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylpnenyl ether, polyoxyethylene monolaurate, polyoxyethylene monostearate, polyoxyethylene monooleate, sorbitan monolaurate, sorbitan-tristearate, sorbitan monostearate, sorbitan trioleate, polyoxyethylene sorbitan monolaurate and the like.

Polyoxyalkylene group-containing anionic emulsifier having anionic group and polyoxyalkylene group such as polyoxyethylene group, polyoxypropylene group or the like per molecule, or reactive anionic emulsifier having anionic group and radical-polymerizable unsaturated group per molecule may also be used. Of these, use of the reactive anionic emulsifier is preferred.

As the reactive anionic emulsifier, sodium salts or ammonium salts of sulfonic acid compounds having radical-polymerizable unsaturated groups such as (meth)allyl group, (meth)acryloyl group, propenyl group, butenyl group and the like can be named. Of those, ammonium salts of sulfonic acid compounds having such radical-polymerizable unsaturated groups are preferred because of excellent water resistance of formed coating film. As the ammonium salt of sulfonic acid compound available on the market, for example, LATEMUL S-180A (tradename, KAO Corporation) or the like can be named.

Of the ammonium salts of sulfonic acid compounds having radical-polymerizable unsaturated groups, ammonium salts of sulfonic acid compounds having radical-polymerizable unsaturated group and polyoxyalkylene group are particularly preferred. As commercially available ammonium salts of sulfonic acid compounds having radical-polymerizable unsaturated group and polyoxyalkylene group, for example, AQUALON KH-10 (tradename, Daiichi Kogyo Seiyaku Co., Ltd.) and SR-1025A (tradename, Asahi Denka Co., Ltd.) can be named.

The emulsifier can be used within the range of normally 0.1-15 mass %, preferably 0.5-10 mass %, inter alia, 1-5 mass %, based on the total amount of all the monomers used.

The polymerization initiator may be either oil-soluble or water-soluble, examples of which include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobisisobutyronitrile, azobis(2,4-dimethylvarelonitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)propionamide], azobis{2-methyl-N-[2-(1-hydroxybutyl)]propionamide} and the like; and persulfates such as potassium persulfate, ammonium persulfate, sodium persulfate and the like. These can be used either alone or in combination of two or more. Furthermore, where necessary, such a polymerization initiator may be co-used with reducing agent such as sugar, sodium formaldehyde sulfoxylate, iron complex and the like to form a redox polymerization system.

The polymerization initiator is preferably used within the range of generally 0.1-5 mass %, in particular, 0.2-3 mass %, based on the total mass of all of the monomers used. Method of adding the polymerization initiator is not particularly limited and can be suitably selected according to its kind and amount. For example, it may be advancedly contained in the monomer mixture or aqueous medium, or may be added in lump or dropwise at the time of polymerization.

The water-dispersible acrylic resin (B-3) can be obtained by adding to the emulsion formed as described above, a monomer mixture (II) comprising the hydroxyl-containing polymerizable unsaturated monomer (f), hydrophobic polymerizable unsaturated monomer (j) and polymerizable unsaturated monomer (k) other than the monomers (f) and (j), and further continuing the polymerization.

The monomer mixture (II) can suitably contain, where necessary, such components as polymerization initiator, chain transfer agent, reducing agent, emulsifier and the like, as named in the foregoing.

The monomer mixture (II) may be added dropwise as it is, but it is generally desirable to disperse it in an aqueous medium and to add the resultant monomer emulsion dropwise. The particle size of the monomer emulsion in this case is not particularly limited.

Polymerization of the monomer mixture (II) can be carried out, for example, by adding the optionally emulsified monomer mixture (II) to aforesaid resin dispersion in lump or dropwise, and heating the system to a suitable temperature under stirring.

Thus obtained water-dispersible acrylic resin (B-3) can take a core/shell type multilayer structure having as the core the copolymer (I) formed from the monomer mixture (I) comprising the polymerizable unsaturated monomer (h) having at least two polymerizable unsaturated groups per molecule and the polymerizable unsaturated monomer (i) having one polymerizable unsaturated group per molecule; and as the shell the copolymer (II) formed from the monomer mixture (II) comprising the hydroxyl-containing polymerizable unsaturated monomer (f), hydrophobic polymerizable unsaturated monomer (j) and polymerizable unsaturated monomer (k) other than the above monomers (f) and (j).

The ratio of the copolymer (I) to the copolymer (II) in the water-dispersible acrylic resin (B-3) preferably lies within the range of generally 10/90-90/10, in particular, 50/50-85/15, inter alia, 65/35-80/20, in terms of solid mass ratio of the copolymer (I)/copolymer (II), from the viewpoint of flip-flop property, metallic mottling and so on of formed coating film.

Thus obtained water-dispersible acrylic resin (B-3) can have average particle size within the range of generally 10-1000 nm, in particular, 20-500 nm. The average particle size values of the water-dispersible acrylic resin (B-3) are those measured at the measuring temperature of 20° C. by coulter counter method. This measurement can be done with, for example, COULTER N4 Model (tradename, Beckman Coulter, Inc.).

It is desirable to neutralize the acidic groups such as carboxyl group in the water-dispersible acrylic resin (B-3) with a neutralizer, for improving mechanical stability of the particles of the resultant water-dispersible acrylic resin (B-3). Any neutralizer can be used without particular limitation, as long as it can neutralize acidic groups. For example, sodium hydroxide, potassium hydroxide, trimethylamine, 2-(dimethylamino)ethanol, 2-amino-2-methyl-1-propanol, triethylamine, ammonia water and the like can be named, and it is desirable to use such a neutralizer in such an amount as will make pH of the water-dispersible acrylic resin after the neutralization around 6.5-9.0.

Hydroxyl-containing polyester resin (B-2) can be usually prepared by esterification reaction or ester-interchange reaction of polybasic acid component with polyhydric alcohol component, and also by adding polyhydric alcohol component to carboxyl-containing polyester resin.

As the polybasic acid component, those compounds customarily used as acid component in production of polyester resins can be used, examples of which include polybasic acids such as phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid and the like; anhydrides of these polybasic acids; lower alkyl esters of these polybasic acids; and the like. These polybasic acid components can be used either alone or in combination of two or more.

The polyhydric alcohol component is a compound having at least two hydroxyl groups per molecule, examples of which include α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxypropane-1,2-diol and the like; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (an ester of hydroxypivalic acid with neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetroxaspiro[5,5]undecane, diethylene glycol, triethylene glycol, glycerin, diglycerin, triglycerin, pentaerythritol, dipentaerythritol, sorbitol, mannitol, trimethylolethane, trimethylolpropane, ditrimethylolpropane, tris(2-hydroxydiethyl)isocyanurate and the like. These can be used either alone or in combination of two or more.

The hydroxyl-containing polyester resin (B-2) may be copolymerized with monocarboxylic acid, monohydric alcohol or hydroxycarboxylic acid. As such copolymerizing component, for example, lauric acid, myristic acid, palmitic acid, stearic acid, oleic acid, linoleic acid, linolenic acid, benzoic acid, p-tert-butylbenzoic acid, cyclohexanoic acid, 4-hydroxyphenylstearic acid, stearyl alcohol, 2-phenoxyethanol, ε-caprolactone, lactic acid, β-hydroxybutyric acid, p-hydroxyethoxybenzoic acid and the like can be named.

The esterification or ester-interchange reaction of above polybasic acid component with polyhydric alcohol component can be carried out by the means known per se, for example, by polycondensing the polybasic acid component with polyhydric alcohol component at temperatures of about 180-about 250° C.

The hydroxyl-containing polyester resin (B-2) may also be modified, either during or after preparation of the polyester resin, by reaction with fatty acid, monoepoxy compound or the like. As the fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid can be named; and as the monoepoxy compound, for example, CARDURA E10P (tradename, Japan Epoxy Resin Co., a glycidyl ester of synthetic highly branched fatty acid) can be named.

The hydroxyl-containing polyester resin (B-2) preferably has an acid value within the range of generally 5-100 mgKOH/g, in particular, 10-80 mgKOH/g, inter alia, 15-60 mgKOH/g, and also a hydroxyl value within the range of generally 10-200 mgKoH/g, in particular, 30-170 mgKOH/g, inter alia, 60-150 mgKOH/g. The hydroxyl-containing polyester resin (B-2) conveniently has a weight-average molecular weight within the range of generally 500-50,000, in particular, 1,000-20,000, inter alia, 1,500-10,000.

Melamine Resin (C)

The melamine resin (C) used in water-based paint compositions of the invention has a weight average molecular weight within the range of generally 1,000-5,000, preferably 1,200-4,000, inter alia, 2,000-3,000. Use of the specific melamine resin having a weight-average molecular weight within the above range enables water-based paint compositions of the invention to form coating film excelling in water resistance.

As the melamine resin (C), for example, partially or wholly methylolated melamine resins obtained through reaction of melamine with aldehyde can be named. As the aldehyde, for example, formaldehyde, paraformaldehyde, trioxane and the like can be named. Those partially or wholly methylolated melamine resins which are further partially or wholly etherified with alcohol can also be used. As the alcohol useful for the etherification, for example, $C_{1-8}$, preferably $C_{1-4}$, alkanols such as methyl alcohol, ethyl alcohol, n-propyl alcohol, i-propyl alcohol, n-butyl alcohol, i-butyl alcohol, 2-ethylbutanol, 2-ethylhexanol and the like can be named.

As the melamine resin (C), alkyl-etherified melamine resins such as methyl-etherified melamine resin formed by partially or wholly etherifying methylol groups in partially or wholly methylolated melamine resin with methyl alcohol;

butyl-etherified melamine resin formed by partially or wholly etherifying methylol groups in partially or wholly methylolated melamine resin with butyl alcohol; and methyl-butyl mixed-etherified melamine resin formed by partially or wholly etherifying methylol groups in partially or wholly methylolated melamine resin with methyl alcohol and butyl alcohol are particularly preferred.

Water-Based Paint Compositions

The water-based paint compositions of the present invention can be formulated by uniformly mixing the above-described copolymer (A), hydroxyl-containing resin (B) and melamine resin (C) by ordinary paint-forming means. Preferred blend ratios (contents) of the copolymer (A), hydroxyl-containing resin (B) and melamine resin (C) in the water-based paint compositions of the invention are within the following ranges, per 100 mass parts of the total solid resin contents of the copolymer (A), hydroxyl-containing resin (B) and melamine resin (C):

copolymer (A): generally 1-50 mass parts, in particular, 2-20 mass parts, inter alia, 3-10 mass parts hydroxyl-containing resin (B): generally 20-90 mass parts, in particular, 25-70 mass parts, inter alia, 30-60 mass parts melamine resin (C): generally 5-50 mass parts, in particular, 10-40 mass parts, inter alia, 20-30 mass parts.

The water-based paint compositions according to the invention can contain, besides the hydroxyl-containing resin (B), modifying resins which do not have hydroxyl groups and are water-soluble or water-dispersible, such as polyurethane resin, polyester resin, acrylic resin, alkyd resin, silicone resin, fluorine-containing resin, epoxy resin and the like. In respect of chipping resistance and water resistance, it is particularly preferable to contain water-soluble or water-dispersible polyurethane resin. These modifying resins can be used either alone or in combination of two or more.

When the water-based paint compositions of the invention contain a modifying resin as above, the amount of the modifying resin to be blended is preferably within the range of normally 1-50 mass parts, in particular, 3-40 mass parts, inter alia, 5-30 mass parts, per 100 mass parts of the total solid resin content of the copolymer (A), hydroxyl-containing resin (B) and melamine resin (C).

Also when the hydroxyl-containing resin (B) and/or the modifying resin contain crosslinkable functional groups such as hydroxyl, carboxyl, epoxy and the like groups, the water-based paint compositions of the invention can contain other curing agent having functional groups which are reactable with the crosslinkable functional groups, in addition to the melamine resin (C).

As such other curing agent, compounds having functional groups which are reactable with the crosslinkable functional groups, for example, amino resin, polyisocyanate compound, blocked polyisocyanate compound, epoxy-containing compound, carboxyl-containing compound, carbodiimide group-containing compound and the like can be named. Of these, use of blocked polyisocyanate compound and/or carbodiimide group-containing compound is preferred.

As the blocked polyisocyanate compound, for example, polyisocyanate compound having at least two isocyanate groups per molecule, whose isocyanate groups are blocked with a blocking agent such as oxime, phenol, alcohol, lactam, mercaptan or the like, can be used.

As the carbodiimide group-containing compound, for example, those polyisocyanate compounds whose isocyanate groups are subjected to mutual de-carbon dioxide reaction can be used.

As commercially available carbodiimide group-containing compounds, for example, CARBODILITE V-02, CARBODILITE V-02-L2, CARBODILITE V-04, CARBODILITE E-01 and CARBODILITE E-02 (tradename, Nisshinbo Industries, Inc.) can be named.

When the water-based paint compositions of the invention contain the other curing agent, the blended amount of the curing agent preferably is within the range of normally 1-40 mass parts, in particular, 5-20 mass parts, per 100 mass parts of the total solid resin content of the copolymer (A), hydroxyl-containing resin (B) and melamine resin (C).

The water-based paint compositions of the present invention preferably also contain hydrophobic solvent (D). Hydrophobic solvent (D) is an organic solvent whose mass soluble in 100 g of water at 20° C. is not more than 10 g, preferably not more than 5 g, inter alia, not more than 1 g, examples of which include hydrocarbon solvents such as rubber gasoline, mineral spirit, toluol, xylol, solvent naphtha and the like; alcohol solvents such as n-hexanol, n-octanol, 2-octanol, 2-ethylhexanol, n-decanol, benzyl alcohol, ethylene glycol 2-ethylhexyl ether, propylene glycol n-butyl ether, dipropylene glycol n-butyl ether, tripropylene glycol n-butyl ether, propylene glycol 2-ethylhexyl ether and the like; and ketone solvents such as methyl isobutyl ketone, cyclohexanone, ethyl n-amyl ketone, diisobutyl ketone and the like. These can be used either alone or in combination of two or more.

When the water-based paint compositions of the invention contain hydrophobic solvent (D), the blended amount of the hydrophobic solvent (D) is preferably within the range of normally 10-100 mass parts, in particular, 20-80 mass parts, inter alia, 30-60 mass parts, per 100 mass parts of the total solid resin content of the copolymer (A), hydroxyl-containing resin (B) and melamine resin (C).

As the hydrophobic solvent (D), use of alcoholic hydrophobic solvent is preferred from the viewpoint of distinctness of image of formed coating film. In particular, $C_{7-14}$ alcoholic hydrophobic solvents, preferably at least one alcoholic hydrophobic solvent selected from the group consisting of n-octanol, 2-octanol, 2-ethyl-1-hexanol, ethylene glycol 2-ethylhexyl ether, propylene glycol n-butyl ether and dipropylene glycol n-butyl ether, are preferred.

The water-based paint compositions of the invention can also contain effect pigment (E). Effect pigment (E) is a pigment which imparts to the coating film sparkling brilliance or iridescent pattern. Specifically, at least one pigment selected from the group consisting of non-leafing type or leafing type aluminum (including vapor-deposited aluminum), copper, zinc, brass, nickel, aluminum oxide, mica, aluminum oxide coated with titanium oxide or iron oxide and mica coated with titanium oxide or iron oxide can be used. Of these, use of aluminum pigment is particularly preferred.

Above metallic pigments are preferably flaky. Also as these metallic pigments, those having the longitudinal dimension within the range of normally 1-100 μm, in particular, 5-40 μm, and the thickness, within a range of normally 0.0001-5 μm, in particular, 0.001-2 μm are suitable.

The blended amount of the effect pigment (E) preferably is within the range of normally 1-50 mass parts, in particular, 5-35 mass parts, inter alia, 8-20 mass parts, per 100 mass parts of the total solid resin content of the copolymer (A), hydroxyl-containing resin (B) and melamine resin (C).

The water-based paint compositions of the invention can furthermore contain, where necessary, ordinary paint additives such as coloring pigment, extender pigment, curing catalyst, thickener, UV absorber, light stabilizer, defoamer, plasticizer, organic solvent, surface regulating agent, antisettling agent and the like, either alone or in combination of two or more.

Examples of coloring pigment include titanium oxide, zinc flower, carbon black, molybdenum red, Prussian blue, cobalt blue, azo pigment, phthalocyanine pigment, quinacridone pigment, isoindoline pigment, vat pigment, perylene pigment and the like; and examples of the extender pigment include talc, clay, kaolin, baryta, barium sulfate, barium carbonate, calcium carbonate, silica, alumina white and the like.

As the curing catalyst, for example, sulfonic acid such as paratoluenesulfonic acid, dodecylbenzenesulfonic acid, dinonylnapthalenesulfonic acid and the like, and salts of these acids with amine can be named.

Substrates to which the water-based paint compositions of the invention are applicable are not particularly limited and include, for example, metallic materials such as iron, aluminium, brass, copper plate, stainless steel sheet, tin plate, zinc-plated steel sheet, zinc alloy (Zn—Al, Zn—Ni, Zn—Fe and the like)-plated steel sheet, and the like; plastic materials such as resins, e.g., polyethylene resin, polypropylene resin, acrylonitrile-butadiene-styrene (ABS) resin, polyamide resin, acrylic resin, vinylidene chloride resin, polycarbonate resin, polyurethane resin and epoxy resin, various FRP's and the like; inorganic materials such as glass, cement, concrete and the like; wood; and fibrous materials (paper, cloth and the like). Of these, metallic materials and plastic materials are preferred.

Also the coating objects to which the water-based paint compositions of the invention are applicable are subject to no particular limitation. By way of example, outer panel portions of car bodies such as of automobiles, trucks, motorcycles, buses and the like: car parts; outer panel portions of house electric appliances such as mobile phones, audio instruments and the like can be named. Of these, outer panel portions of cars and car parts are preferred.

The coating objects may also be metallic surfaces of such metallic materials or car bodies made thereof, which have been given a surface treatment such as phosphate treatment, chromate treatment, complex oxide treatment or the like. Furthermore, the coating objects may be such metallic substrates or car bodies on which an undercoating film of various electrodeposition paints and/or intermediate coating film are formed.

Coating method of the water-based paint compositions of the present invention is subject to no particular limitation and, for example, air spray coating, airless spray coating, rotary atomizing coating, curtain flow coating and the like may be used. Wet coating films can be formed by these methods. During the coating, static electricity may be impressed where necessary. Of these, air spray coating and rotary atomizing coating are preferred. The amount of the water-based paint composition to be applied is preferably such that will make the cured film thickness normally around 5-70 μm, in particular, around 10-50 μm.

Curing of the wet coating film can be effected by heating, after applying a present water-based paint composition of the invention onto a coating object. Heating can be given by per se known heating means, for example, with drying oven such as hot air oven, electric oven or infrared ray induction heating oven. Suitable heating temperature normally ranges about 80-about 180° C., preferably about 100-about 170° C., inter alia, about 120-about 160° C. While the heating time is not critical, it can be normally around 10-40 minutes, preferably around 15-30 minutes.

The water-based paint compositions of the present invention can be conveniently used as automobile paint, and can be conveniently used as water-based base coat paint in the coating method comprising applying a water-based base coat paint which contains effect pigment and/or coloring pigment onto a coating object, and then applying a clear paint.

When a water-based paint composition according to the invention is used as the water-based base coat paint, for example, a multilayer coating film can be formed by 2-coat-1-bake system comprising applying onto a coating object, which has been given an electrodeposition coating and/or intermediate coating, a water-based paint composition of the invention, applying a clear paint onto the uncured coating film, without curing the formed coating film, and thereafter curing by heating the uncured coating film and clear coating film simultaneously. The "uncured coating film" includes coating film in set-to-touch dry condition and that in semi-cured dry condition.

When a water-based paint composition of the invention is applied by the 2-coat-1-bake system, its coated film thickness in terms of cured film thickness can be within the range of normally 5-40 μm, in particular, 10-30 μm, inter alia, 10-20 μm. Also the coated film thickness in terms of cured film thickness of the clear paint can be within the range of normally 10-80 μm, preferably 15-60 μm.

Also in the occasions of forming multilayer coating film by above 2-coat-1-bake system, it is preferred to carry out, after applying a water-based paint composition of the invention, a preheating (preliminary heating) or air blowing under the heating conditions as will not substantially cure the coating film, to prevent occurrence of defect in the coating film such as cissing. The preheating temperature normally ranges about 40-about 100° C., preferably about 50-about 90° C., inter alia, about 60-about 80° C. The preheating time can range normally around 30 seconds-15 minutes, preferably around 1-10 minutes, inter alia, around 2-5 minutes. The air blowing can be normally carried out by blowing against the coated surface of the coating object, air of ambient temperature or air heated to a temperature of about 25-about 80° C. Again, after applying the clear paint, where necessary an interval of around 1-60 minutes, preferably around 3-20 minutes, may be taken at room temperature or a preheating at about 40-about 80° C. may be given for around 1-60 minutes, followed by heat-curing the coating film.

The heat-curing of the water-based paint composition and the clear paint can be effected by above-described per se known heating means, and it is suitable to cure the two coating films simultaneously, by heating at temperatures of normally about 80-about 180° C., preferably about 100-about 170° C., inter alia, about 120-about 160° C., for about 10-40 minutes, preferably about 15-30 minutes.

The water-based paint compositions of the present invention can be conveniently used as intermediate paint and/or base coat paint, when a multilayer coating film is formed by 3-coat-1-bake system comprising applying an intermediate paint onto a coating object, applying onto the uncured intermediate coating film, without curing that coating film, a base coat paint, and further applying onto the uncured base coat coating film, without curing that coating film, a clear paint, and heat curing the three-layered coating film of the intermediate paint, base coat paint and clear paint simultaneously.

Where the water-based paint composition(s) of the invention are applied by above 3-coat-1-bake system, the intermediate paint is suitably applied to provide a cured film thickness within the range of normally 10-60 μm, preferably 20-40 μm; the base coat paint is suitably applied to provide a cured film thickness within the range of normally 5-40 μm, preferably 10-30 μm, inter alia, 10-20 μm; and the clear paint is suitably applied to provide a cured film thickness within the range of normally 10-80 μm, preferably 15-60 μm.

When water-based paint composition(s) of the present invention are used as the intermediate paint and/or base coat paint, it is preferred to carry out, after applying the water-based paint composition(s) of the invention, preheating (preliminary heating), air blowing or the like under the conditions as will not substantially cure the coating film(s). The preheating can be effected normally at about 40-about 100° C., preferably about 50-about 90° C., inter alia, about 60-about 80° C. The preheating time can range normally 30 seconds-15 minutes, preferably 1-10 minutes, inter alia, around 2-5 minutes. The air blowing can be normally carried out by blowing against the coated surface of the coating object, air of ambient temperature or air heated to a temperature of about 25-about 80° C. Also after applying the clear paint, where necessary an interval of around 1-60 minutes, preferably around 3-20 minutes may be taken at room temperature or a preheating may be given at about 40-about 80° C. for around 1-60 minutes, followed by heat-curing of the coating film.

Curing of the coating film can be effected by per se known heating means, and it is normally suitable to simultaneously cure the three-layered coating film by heating at temperatures of normally about 80-about 180° C., preferably about 100-about 170° C., inter alia, about 120-about 160° C., for about 10-40 minutes, preferably about 15-30 minutes.

Use of the water-based paint compositions of the present invention enables formation of coating film of excellent performance and appearance, and hence the water-based paint compositions of the present invention can be favorably used as automobile paint.

Where the water-based paint compositions of the invention are used as intermediate paint, per se known thermosetting base coat paint can be used as the base coat paint. Specifically, paint comprising a base resin such as alkyd resin, polyester resin, acrylic resin, urethane resin or the like and curing agent such as amino resin, polyisocyanate compound, blocked polyisocyanate compound, carbodiimide group-containing compound and the like can be used. As the base coat paint, high solid paint, water-based paint and the like which use less organic solvent are suitably used, from the viewpoint of environmental problems and resource saving.

When the water-based paint compositions of the invention are used as the base coat paint, per se known thermosetting intermediate paint can be used as the intermediate paint. Specifically, paint comprising a base resin such as alkyd resin, polyester resin, acrylic resin, urethane resin or the like and curing agent such as amino resin, polyisocyanate compound, blocked polyisocyanate compound, carbodiimide group-containing compound and the like can be used. As the intermediate paint, high solid paint, water-based paint, powder paint and the like which use less organic solvent are suitably used, from the viewpoint of environmental problems and resource saving.

As the clear paint, for example, those per se known and customarily used for automobile coating can be used. For example, organic solvent-based thermosetting paint compositions, water-based thermosetting paint compositions, powder thermosetting paint compositions, which comprise as the resin components base resin such as acrylic resin, polyester resin, alkyd resin, urethane resin, epoxy resin, fluorine-containing resin and the like, which contain crosslinkable functional groups such as hydroxyl, carboxyl, epoxy, silanol and the like groups; and crosslinking agent such as melamine resin, urea resin, optionally blocked polyisocyanate compound, carboxyl-containing compound or resin, epoxy-containing compound or resin can be named. Of these, thermosetting paint comprising carboxyl-containing resin and epoxy-containing resin, and thermosetting paint comprising hydroxyl-containing resin and optionally blocked polyisocyanate compound are preferred.

The clear paint composition may be of one-package type paint or multi-package type paint such as two-package type urethane resin paint.

The clear paint composition may also contain, where necessary, coloring pigment, effect pigment, dye or the like to an extent not impairing transparency of formed coating film, and furthermore, suitably extender pigment, curing catalyst, UV absorber, light stabilizer, defoamer, thickener, rust-proofing agent, plasticizer, organic solvent, surface-regulating agent, antisettling agent and the like.

EXAMPLES

Hereinafter the invention is explained more specifically, referring to working Examples and Comparative Examples, it being understood that the invention is not limited to these Examples only. "Part" and "%" are invariably by mass.
Preparation of Copolymer (A)

Production Example 1

A reactor equipped with a thermometer, thermostat, stirrer, reflux condenser and dropping device was charged with 35 parts of propylene glycol monomethyl ether and 25 parts of propylene glycol monobutyl ether, which were heated under agitation and maintained at 110° C. Into the reactor a mixture consisting of 30 parts of MPEG 1000 (tradename, Degussa Japan Co., methoxypolyethylene glycol monomethacrylate of the general formula (1) in which $R^1$ is methyl, $R^2$ is methyl, $R^3$ is ethylene and m is 21, having a molecular weight of about 1,000), 19 parts of 4-hydroxybutyl acrylate, 5 parts of dimethylaminoethyl methacrylate, 2 parts of 2-(methacryloyloxy)ethyltrimethylammonium chloride, 5 parts of styrene, 20 parts of isobornyl acrylate, 9 parts of methyl methacrylate, 10 parts of n-butyl acrylate, 1 part of azobisisobutyronitrile and 20 parts of propylene glycol monomethyl ether was added dropwise over 3 hours. After the end of the dropping, the reaction mixture was aged at 110° C. for 30 minutes, and into which an additional catalytic mixture solution formed of 15 parts of propylene glycol monomethyl ether and 0.5 part of azobisisobutyronitrile was added dropwise over an hour. Further aging the reaction mixture at 110° C. for an hour and cooling the same, a copolymer solution (A1) having a solid content of 50% was obtained.

Production Examples 2-39

Production Example 1 was repeated except that the constituent compounds and their blend ratios were changed as shown in the following Table 1, to provide copolymer solutions (A2)-(A39). The solid contents, acid values, hydroxyl values and weight-average molecular weights were as shown in the Table 1. The amount of each of the polymerizable unsaturated monomers is that of the solid content.

TABLE 1

|  | Production Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Copolymer (A) | A1 | A2 | A3 | A4 | A5 | A6 | A7 | A8 | A9 | A10 | A11 |
| Propylene glycol monomethyl ether | 35 | 15 | 15 | 15 | 15 | 15 | 15 | 15 | 15 | 15 | 15 |
| Propylene glycol monobutyl ether | 25 | 25 | 25 | 25 | 25 | 25 | 25 | 25 | 25 | 25 | 25 |
| Monomer Mixture    Monomer (a) MPEG1000 | 30 | | | | | | | | | | |

TABLE 1-continued

| | | | | | | | | | | | | |
|---|---|---|---|---|---|---|---|---|---|---|---|---|
| | NF Bisomer PEM6E (note 1) | | 19 | | | | | | | | | |
| | NF Bisomer S20W (note 2) | | | 20 | 20 | 20 | 20 | 20 | 20 | 20 | 20 | 20 |
| Monomer (b) | 2-hydroxyethyl acrylate | | | 9 | 6 | 15 | 10 | 19 | | | 15 | |
| | 2-hydroxyethyl methacrylate | | | | | | | | | | | |
| | 4-hydroxybutyl acrylate | 19 | | | | | | | 19 | 19 | | 19 | 19 |
| | PLACCEL FM-1 (note 3) | | | | 19 | | | | | | | |
| Monomer (c) | dimethylaminoethyl methacrylate | 5 | 5 | 5 | 5 | 5 | 5 | 5 | 5 | 10 | | 5 |
| | 2-(methacryloyloxy)ethyltri-methylammonium chloride | 2 | 2 | 2 | 2 | 2 | 2 | 2 | 2 | | 5 | 2 |
| Monomer (d-1) | isobornyl acrylate | 20 | 20 | 20 | 20 | 20 | 20 | 20 | | 20 | 20 | 10 |
| | isobornyl methacrylate | | | | | | | | 20 | | | |
| Monomer (d-2) | 2-ethylhexyl acrylate | | | | | | | | | | | 10 |
| | lauryl methacrylate | | | | | | | | | | | |
| | isostearyl acrylate | | | | | | | | | | | |
| Monomer (e) | methyl methacrylate | 9 | 10 | 13 | 23 | 28 | 19 | 19 | 19 | 19 | 21 | 19 |
| | n-butyl acrylate | 10 | 10 | 10 | 10 | 10 | 10 | 10 | 10 | 11 | 10 | 10 |
| | n-butyl methacrylate | | | | | | | | | | | |
| | styrene | 5 | 5 | 5 | 5 | 5 | 5 | 5 | 5 | 5 | 5 | 5 |
| | methacrylic acid | | | | | | | | | | | |
| | azobisisobutyronitrile | 1 | 1 | 1 | 1 | 1 | 1 | 1 | 1 | 1 | 1 | 1 |
| | propylene glycol monomethyl ether | 20 | 20 | 20 | 20 | 20 | 20 | 20 | 20 | 20 | 20 | 20 |
| Additional catalytic mixture solution | propylene glycol monomethyl ether | 15 | 15 | 15 | 15 | 15 | 15 | 15 | 15 | 15 | 15 | 15 |
| | azobisisobutyronitrile | 0.5 | 0.5 | 0.5 | 0.5 | 0.5 | 0.5 | 0.5 | 0.5 | 0.5 | 0.5 | 0.5 |
| Parameter values | solid content [mass %] | 50 | 50 | 50 | 50 | 50 | 50 | 50 | 50 | 50 | 50 | 50 |
| | acid value [mgKOH/g] | 0.5> | 0.5> | 0.5> | 0.5> | 0.5> | 0.5> | 0.5> | 0.5> | 0.5> | 0.5> | 0.5> |
| | hydroxyl value [mgKOH/g] | 74 | 74 | 71 | 73 | 48 | 92 | 74 | 74 | 73 | 74 | 74 |
| | weight-average molecular weight [×10$^4$] | 2.0 | 2.0 | 1.9 | 2.0 | 2.0 | 2.0 | 2.0 | 2.0 | 2.2 | 1.8 | 1.9 |

| | | Production Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Copolymer (A) | | A12 | A13 | A14 | A15 | A16 | A17 | A18 | A19 | A20 | A21 | A22 |
| Propylene glycol monomethyl ether | | 15 | 15 | 15 | 15 | 15 | 15 | 35 | 35 | 15 | 15 | 15 |
| Propylene glycol monobutyl ether | | 25 | 25 | 25 | 25 | 25 | 25 | 25 | 25 | 25 | 25 | 25 |
| Monomer Mixture | Monomer (a) MPEG1000 | | | | | | | | | | | |
| | NF Bisomer PEM6E (note 1) | | | | | | | | | | | |
| | NF Bisomer S20W (note 2) | 20 | 20 | 20 | 20 | 20 | 20 | | | 20 | 20 | 20 |
| Monomer (b) | 2-hydroxyethyl arcylate | | 15 | 15 | 15 | 15 | 15 | 13 | 13 | | 10 | |
| | 2-hydroxyethyl methacrylate | | | | | | | | | | | |
| | 4-hydroxybutyl acrylate | 19 | | | | | | | | | | 19 |
| | PLACCEL FM-1 (note 3) | | | | | | | | | | | |
| Monomer (c) | dimethylaminoethyl methacrylate | 5 | 5 | 5 | 5 | 5 | 5 | | | 5 | | 6 |
| | 2-(methacryloyloxy)ethyltri-methylammonium chloride | 2 | 2 | 2 | 2 | 2 | 2 | 5 | 20 | 2 | | 1 |
| Monomer (d-1) | isobornyl acrylate | 20 | 20 | | | | | 10 | 10 | 10 | 20 | |
| | isobornyl methacrylate | | | | | | | | | | 5 | |
| Monomer (d-2) | 2-ethylhexyl acrylate | 5 | | 20 | | | | 10 | 10 | | | |
| | lauryl methacrylate | | | | 20 | | | | | | | |
| | isostearyl acrylate | | | | | 20 | | | | | | |
| Monomer (e) | methyl methacrylate | 19 | 23 | 23 | 23 | 23 | 23 | 31 | 22 | 30 | 30 | 44 |
| | n-butyl acrylate | 10 | 15 | 15 | 15 | 15 | 15 | | | 10 | 15 | 10 |
| | n-butyl methacrylate | | | | | | | 20 | 20 | 13 | | |
| | styrene | | | 20 | | | | 5 | 5 | 5 | 5 | |
| | methacrylic acid | | | | | | | | | 6 | | |
| | azobisisobutyronitrile | 1 | 1 | 1 | 1 | 1 | 1 | 1 | 1 | 1 | 1 | 1 |
| | propylene glycol monomethyl ether | 20 | 20 | 20 | 20 | 20 | 20 | 20 | 20 | 20 | 20 | 20 |
| Additional catalytic mixture solution | propylene glycol monomethyl ether | 15 | 15 | 15 | 15 | 15 | 15 | 15 | 15 | 15 | 15 | 15 |
| | azobisisobutyronitrile | 0.5 | 0.5 | 0.5 | 0.5 | 0.5 | 0.5 | 0.5 | 0.5 | 0.5 | 0.5 | 0.5 |
| Parameter values | solid content [mass %] | 50 | 50 | 50 | 50 | 50 | 50 | 50 | 50 | 50 | 50 | 50 |
| | acid value [mgKOH/g] | 0.5> | 0.5> | 0.5> | 0.5> | 0.5> | 0.5> | 0.5> | 0.5> | 0.5> | 0.5> | 0.5> |
| | hydroxyl value [mgKOH/g] | 74 | 73 | 73 | 73 | 73 | 73 | 63 | 63 | 0 | 48 | 74 |
| | weight-average molecular weight [×10$^4$] | 1.8 | 1.8 | 2.3 | 2.0 | 2.1 | 2.1 | 3.5 | 1.5 | 2.0 | 3.0 | 1.8 |

| | | Production Example | | | | | | | | |
|---|---|---|---|---|---|---|---|---|---|---|
| | | 23 | 24 | 25 | 26 | 27 | 28 | 29 | 30 | 31 |
| Copolymer (A) | | A23 | A24 | A25 | A26 | A27 | A28 | A29 | A30 | A31 |
| Propylene glycol monomethyl ether | | 35 | 15 | 15 | 15 | 15 | 15 | 15 | 35 | 15 |
| Propylene glycol monobutyl ether | | 25 | 25 | 25 | 25 | 25 | 25 | 25 | 25 | 25 |
| Monomer Mixture | Monomer (a) MPEG1000 | 30 | | | | | | | | |
| | NF Bisomer PEM6E (note 1) | | 19 | | | | | | | |
| | NF Bisomer S20W (note 2) | | | 20 | 20 | 20 | 20 | 20 | 20 | 20 |
| Monomer (b) | 2-hydroxyethyl arcylate | | | 9 | 6 | 15 | 10 | 19 | | 15 |
| | 2-hydroxyethyl methacrylate | | | | | | | | | |
| | 4-hydroxybutyl acrylate | 19 | | | | | | | 19 | 19 |
| | PLACCEL FM-1 (note 3) | | | | 19 | | | | | |

TABLE 1-continued

| | | | | | | | | | | |
|---|---|---|---|---|---|---|---|---|---|---|
| Monomer (c) | dimethylaminoethyl methacrylate | 5 | 5 | 5 | 5 | 5 | 5 | 5 | 10 | |
| | 2-(methacryloyloxy)ethyltrimethylammonium chloride | 2 | 2 | 2 | 2 | 2 | 2 | 2 | | 5 |
| Monomer (d-1) | isobornyl acrylate | | | | | | | | | |
| | isobornyl methacrylate | | | | | | | | | |
| Monomer (d-2) | 2-ethylhexyl acrylate | 20 | 20 | 20 | 20 | 20 | 20 | 20 | 20 | 20 |
| | lauryl methacrylate | | | | | | | | | |
| | isostearyl acrylate | | | | | | | | | |
| Monomer (e) | methyl methacrylate | 9 | 10 | 13 | 23 | 28 | 19 | 19 | 19 | 21 |
| | n-butyl acrylate | 10 | 10 | 10 | 10 | 10 | 10 | 10 | 11 | 10 |
| | n-butyl methacrylate | | | | | | | | | |
| | styrene | 5 | 5 | 5 | 5 | 5 | 5 | 5 | 5 | 5 |
| | methacrylic acid | | | | | | | | | |
| azobisisobutyronitrile | | 1 | 1 | 1 | 1 | 1 | 1 | 1 | 1 | 1 |
| propylene glycol monomethyl ether | | 20 | 20 | 20 | 20 | 20 | 20 | 20 | 20 | 20 |
| Additional catalytic mixture solution | propylene glycol monomethyl ether | 15 | 15 | 15 | 15 | 15 | 15 | 15 | 15 | 15 |
| | azobisisobutyronitrile | 0.5 | 0.5 | 0.5 | 0.5 | 0.5 | 0.5 | 0.5 | 0.5 | 0.5 |
| Parameter values | solid content [mass %] | 50 | 50 | 50 | 50 | 50 | 50 | 50 | 50 | 50 |
| | acid value [mgKOH/g] | 0.5> | 0.5> | 0.5> | 0.5> | 0.5> | 0.5> | 0.5> | 0.5> | 0.5> |
| | hydroxyl value [mgKOH/g] | 74 | 74 | 71 | 73 | 48 | 92 | 74 | 73 | 74 |
| | weight-average molecular weight [×10$^4$] | 2.0 | 2.0 | 1.9 | 2.0 | 2.0 | 2.0 | 2.0 | 2.2 | 1.8 |

| | | Production Example | | | | | | | |
|---|---|---|---|---|---|---|---|---|---|
| | | 32 | 33 | 34 | 35 | 36 | 37 | 38 | 39 |
| Copolymer (A) | | A32 | A33 | A34 | A35 | A36 | A37 | A38 | A39 |
| Propylene glycol monomethyl ether | | 15 | 15 | 15 | 35 | 35 | 15 | 15 | 15 |
| Propylene glycol monobutyl ether | | 25 | 25 | 25 | 25 | 25 | 25 | 25 | 25 |
| Monomer Mixture | Monomer (a) MPEG1000 | | | | | | | | |
| | NF Bisomer PEM6E (note 1) | | | | | | | | |
| | NF Bisomer S20W (note 2) | 20 | 20 | 20 | | | 20 | 20 | 20 |
| | Monomer (b) 2-hydroxyethyl arcylate | | | | 13 | 13 | | 10 | |
| | 2-hydroxyethyl methacrylate | | | | | | | | |
| | 4-hydroxybutyl acrylate | 19 | 19 | 19 | | | | | 19 |
| | PLACCEL FM-1 (note3) | | | | | | | | |
| | Monomer (c) dimethylaminoethyl methacrylate | 5 | 5 | 5 | | | 5 | | 6 |
| | 2-(methacryloyloxy)ethyltrimethylammonium chloride | 2 | 2 | 2 | 5 | 20 | 2 | | 1 |
| | Monomer (d-1) isobornyl acrylate | | | | | | | | |
| | isobornyl methacrylate | | | | | | | | |
| | Monomer (d-2) 2-ethylhexyl acrylate | 20 | | | 20 | 20 | 15 | | |
| | lauryl methacrylate | | 20 | | | | | 20 | |
| | isostearyl acrylate | | | 20 | | | | | |
| | Monomer (e) methyl methacrylate | 19 | 19 | 19 | 31 | 22 | 30 | 30 | 44 |
| | n-butyl acrylate | 15 | 10 | 10 | | | 10 | 15 | 10 |
| | n-butyl methacrylate | | | | 20 | 20 | 13 | | |
| | styrene | | 5 | 5 | 5 | 5 | 5 | 5 | |
| | methacrylic acid | | | | 6 | | | | |
| azobisisobutyronitrile | | 1 | 1 | 1 | 1 | 1 | 1 | 1 | 1 |
| propylene glycol monomethyl ether | | 20 | 20 | 20 | 20 | 20 | 20 | 20 | 20 |
| Additional catalytic mixture solution | propylene glycol monomethyl ether | 15 | 15 | 15 | 15 | 15 | 15 | 15 | 15 |
| | azobisisobutyronitrile | 0.5 | 0.5 | 0.5 | 0.5 | 0.5 | 0.5 | 0.5 | 0.5 |
| Parameter values | solid content [mass %] | 50 | 50 | 50 | 50 | 50 | 50 | 50 | 50 |
| | acid value [mgKOH/g] | 0.5> | 0.5> | 0.5> | 0.5> | 0.5> | 0.5> | 39 | 0.5> |
| | hydroxyl value [mgKOH/g] | 74 | 74 | 74 | 63 | 63 | 0 | 48 | 74 |
| | weight-average molecular weight [×10$^4$] | 1.9 | 2.1 | 2.1 | 3.5 | 1.5 | 2.0 | 3.0 | 1.8 |

(note 1) NF BISOMER PEM6E: tradename, Daiichi Kogyo Seiyaku Co., Ltd., polyethylene glycol monomethacrylate of the general formula (1) in which $R^1$ is methyl, $R^2$ is hydrogen, $R^3$ is ethylene and m is 6.
(note 2) NF BISOMER S20W: tradename, Daiichi Kogyo Seiyaku Co., Ltd., 50% water-diluted methoxypolyethylene glycol monomethacrylate of the general formula (1) in which $R^1$ is methyl, $R^2$ is methyl, $R^3$ is ethylene and m is 45, having a molecular weight of approximately 2,000.
(note 3) PLACCEL FM-1: tradename, Daicel Chemical Industries, Ltd., ε-caprolactone-modified hydroxyethyl methacrylate.

Production Examples of Hydroxyl-Containing Resin (B)

Production Example 40

A reactor equipped with a thermometer, thermostat, stirrer, reflux condenser and dropping device was charged with 130 parts of deionized water and 0.52 part of AQUALON KH-10 (Note 4) which were stirred and mixed in gaseous nitrogen current. The temperature was raised to 80° C., and then 1% of the total amount of a later specified monomer emulsion (1) and 5.3 parts of 6% aqueous ammonium persulfate solution were introduced into the reactor and kept at 80° C. for 15 minutes. Then the remainder of the monomer emulsion (1) was dropped into the reactor which was maintained at the same temperature, over 3 hours, followed by an hour's aging. Thereafter a monomer emulsion (2) as specified later was added dropwise over an hour, aged for an hour, and the reaction mixture was cooled to 30° C. under gradual addition of 40 parts of a 5% aqueous dimethylethanolamine solution into the reactor. Discharging the reaction mixture while filtering it through a 100-mesh nylon cloth, a hydroxyl-containing resin (B1) having an average particle size of 100 nm [as measured with a submicron particle size distribution analyzer, COULTER N4 Model (tradename, Beckman Coulter, Inc.), as to a sample diluted with deionized water at 20° C.], solid content of 30%, acid value of 33 mgKOH/g and hydroxyl value of 25 mgKOH/g was obtained.

(Note 4) AQUALON KH-10: tradename, Daiichi Kogyo Seiyaku Co., Ltd., polyoxyethylene alkyl ether sulfate ester ammonium salt; active ingredient, 97%.

Monomer emulsion (1): The monomer emulsion (1) was obtained by mixing by stirring 42 parts of deionized water, 0.72 part of AQUALON KH-10, 2.1 parts of methylenebisacrylamide, 2.8 parts of styrene, 16.1 parts of methyl methacrylate, 28 parts of ethyl acrylate and 21 parts of n-butyl acrylate.

Monomer emulsion (2): The monomer emulsion (2) was obtained by mixing by stirring 18 parts of deionized water, 0.31 part of AQUALON KH-10, 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

Production Examples 41-43

Production Example 40 was repeated except that the constituent components and their blend ratios were changed as shown in the following Table 2, to provide hydroxyl-containing resins (B2)-(B4). The solid contents, acid values and hydroxyl values of the resulting hydroxyl-containing resins (B1)-(B4) are shown in the following Table 2, concurrently with the results of Production Example 40.

TABLE 2

|  |  | Production Example | | | |
|---|---|---|---|---|---|
|  |  | 40 | 41 | 42 | 43 |
|  | Hydroxyl-containing resin (B) | B1 | B2 | B3 | B4 |
|  | Deionized water | 130 | | | |
|  | AQUALON KH-10 (note 4) | 0.52 | | | |
|  | Deionized water | 5 | | | |
|  | ammonium persulfate | 0.3 | | | |
| Monomer emulsion 1 | deionized water | 42 | | | |
|  | AQUALON KH-10 (note 4) | 0.72 | | | |
|  | allyl methacrylate |  |  | 2.1 | 2.1 |
|  | methylenebisacrylamide | 2.1 | 2.1 | | |
|  | styrene | 2.8 | 2.8 | 2.8 | 2.8 |
|  | methyl methacrylate | 16.1 | 16.1 | 16.1 | 16.1 |
|  | ethyl acrylate | 28 | 28 | 28 | 28 |
|  | n-butyl acrylate | 21 | 21 | 21 | 21 |
| Monomer emulsion 2 | deionized water | 18 | | | |
|  | AQUALON KH-10 (note 4) | 0.31 | | | |
|  | ammonium persulfate | 0.03 | | | |
|  | methacrylic acid | 5.1 | 5.1 | 5.1 | 5.1 |
|  | 2-hydroxyethyl acrylate | 5.1 | 5.1 | 5.1 | 5.1 |
|  | 2-ethylhexyl acrylate |  |  | 3 | |
|  | styrene | 3 |  | 3 | |
|  | methyl methacrylate | 6 | 6 | 6 | 9 |
|  | ethyl acrylate | 1.8 | 1.8 | 1.8 | 1.8 |
|  | n-butyl acrylate | 9 | 9 | 9 | 9 |
| 5% Aqueous dimethylethanolamine solution |  | 40 | | | |
| Solid content (mass %) |  | 30 | | | |
| Acid value (mgKOH/g) |  | 33 | 33 | 33 | 33 |
| Hydroxyl value (mgKOH/g) |  | 25 | 25 | 25 | 25 |

Production Example 44

A reactor equipped with a stirrer, reflux condenser, water-separator and thermometer was charged with 109 parts of trimethylolpropane, 141 parts of 1,6-hexanediol, 126 parts of hexahydrophthalic anhydride and 120 parts of adipic acid, and the temperature therein was raised from 160° C. to 230° C. over 3 hours, followed by 4 hours' condensation reaction at 230° C. Then further 38.3 parts of trimellitic anhydride was added to add carboxyl groups to the resultant condensation reaction product, and reacted at 170° C. for 30 minutes. Diluting the reaction product with ethylene glycol 2-ethylhexyl ether (whose soluble mass in 100 g of water at 20° C.: 0.5 g) a hydroxyl-containing resin solution (B5) having an acid value of 46 mgKOH/g, hydroxyl value of 150 mgKOH/g, solid content of 70% and weight-average molecular weight of 6,400 was obtained.

Production Example 45

Production Example 44 was repeated except that the diluting solvent, ethylene glycol 2-ethylhexyl ether, was replaced with ethylene glycol monobutyl ether (whose soluble mass in 100 g of water at 20° C.: infinite), to provide a hydroxyl-containing resin solution (B6).

Production Examples of Effect Pigment Concentrates

An agitation mixing vessel was charged with 35 parts of ethylene glycol 2-ethylhexyl ether and homogeneously mixed with 19 parts of an aluminum pigment paste, GX-180A (Asahikasei Metals Co., Ltd.; metal content, 74%), 8 parts of phosphoric acid group-containing resin solution (note 5) and 0.2 part of 2-(dimethylamino)ethanol, to provide an effect pigment concentrate (P1).

(Note 5) Phosphoric acid group-containing resin solution: A reactor equipped with a thermometer, thermostat, stirrer, reflux condenser and a dropping device was charged with a mixed solvent of 27.5 parts of methoxypropanol and 27.5 parts of isobutanol, which was heated to 110° C. Into the mixed solvent, 121.5 parts of a mixture of 25 parts of styrene, 27.5 parts of n-butyl methacrylate, 20 parts of Isostearyl Acrylate (tradename, Osaka Organic Chemical Industry, Ltd., branched higher alkyl acrylate), 7.5 parts of 4-hydroxybutyl acrylate, 15 parts of phosphoric acid group-containing polymerizable monomer (note 6), 12.5 parts of 2-methacryloyloxyethyl acid phosphate, 10 parts of isobutanol and 4 parts of t-butylperoxyoctanoate was added over 4 hours, and further a mixture of 0.5 part of t-butylperoxyoctanoate and 20 parts of isopropanol was added dropwise over an hour. Aging the resulting reaction mixture for an hour under stirring, a phosphoric acid group-containing resin solution having a solid content of 50% was obtained. The acid value of this resin attributable to the phosphoric acid groups was 83 mgKOH/g, the hydroxyl value attributable to the 4-hydroxybutyl acrylate was 29 mgKOH/g, and its weight-average molecular weight was 10,000.

(Note 6) Phosphoric acid group-containing polymerizable monomer: A reactor equipped with a thermometer, thermostat, stirrer, reflux condenser and dropping device was charged with 57.5 parts of monobutylphosphoric acid and 41 parts of isobutanol. After raising the temperature to 90° C., 42.5 parts of glycidyl methacrylate was added dropwise over 2 hours, followed by another hour's aging under stirring. Thereafter 59 parts of isopropanol was added to provide a phosphoric acid group-containing polymerizable monomer solution having a solid content of 50% was obtained. The acid value of the resulting monomer attributable to the phosphoric acid groups was 285 mgKOH/g.

Production Example 47

Production Example 46 was repeated except that the 35 parts of ethylene glycol 2-ethylhexyl ether was replaced with 35 parts of ethylene glycol monobutyl ether, to provide an effect pigment concentrate (P2).

Examples of Water-Based Paint Compositions

Example 1

A water-based paint composition (X1) of pH8.0 having a solid content of 23% was obtained by homogeneously mixing 20 parts of the copolymer solution (A1) as obtained in Production Example 1, 100 parts of the hydroxyl-containing resin (B1) as obtained in Production Example 40, 43 parts of the hydroxyl-containing resin (B5) as obtained in Production Example 44, 50 parts of a melamine resin (C1) (methyl-butyl mixed-etherified melamine resin, solid content 60%, weight-average molecular weight 2,000) and 62 parts of the effect pigment concentrate (P1) as obtained in Production Example 46, and further adding thereto deionized water and 2-(dimethylamino)ethanol.

Examples 2-39, Comparative Examples 1-14

Example 1 was repeated except that the constituent components and their blend ratios were changed as shown in the following Table 3, to provide water-based paint compositions (X2)-(X53) each having pH of 8.0 and solid content of 23%.

TABLE 3

|  |  | Paint | Copolymer (A) kind | amount | Hydroxyl-containing Resin (B) kind | amount | kind | amount | Melamine Resin (C) kind | amount | Effect Pigment Concentrate kind | amount |
|---|---|---|---|---|---|---|---|---|---|---|---|---|
| Example | 1 | X1 | A1 | 20 | B1 | 100 | B5 | 43 | C1 | 50 | P1 | 62 |
|  | 2 | X2 | A2 | 20 | B1 | 100 | B5 | 43 | C1 | 50 | P1 | 62 |
|  | 3 | X3 | A3 | 20 | B1 | 100 | B5 | 43 | C1 | 50 | P1 | 62 |
|  | 4 | X4 | A4 | 20 | B1 | 100 | B5 | 43 | C1 | 50 | P1 | 62 |
|  | 5 | X5 | A5 | 20 | B1 | 100 | B5 | 43 | C1 | 50 | P1 | 62 |
|  | 6 | X6 | A6 | 20 | B1 | 100 | B5 | 43 | C1 | 50 | P1 | 62 |
|  | 7 | X7 | A7 | 20 | B1 | 100 | B5 | 43 | C1 | 50 | P1 | 62 |
|  | 8 | X8 | A8 | 20 | B1 | 100 | B5 | 43 | C1 | 50 | P1 | 62 |
|  | 9 | X9 | A9 | 20 | B1 | 100 | B5 | 43 | C1 | 50 | P1 | 62 |
|  | 10 | X10 | A10 | 20 | B1 | 100 | B5 | 43 | C1 | 50 | P1 | 62 |
|  | 11 | X11 | A11 | 20 | B1 | 100 | B5 | 43 | C1 | 50 | P1 | 62 |
|  | 12 | X12 | A12 | 20 | B1 | 100 | B5 | 43 | C1 | 50 | P1 | 62 |
|  | 13 | X13 | A13 | 20 | B1 | 100 | B5 | 43 | C1 | 50 | P1 | 62 |
|  | 14 | X14 | A14 | 20 | B1 | 100 | B5 | 43 | C1 | 50 | P1 | 62 |
|  | 15 | X15 | A15 | 20 | B1 | 100 | B5 | 43 | C1 | 50 | P1 | 62 |
|  | 16 | X16 | A16 | 20 | B1 | 100 | B5 | 43 | C1 | 50 | P1 | 62 |
|  | 17 | X17 | A17 | 20 | B1 | 100 | B5 | 43 | C1 | 50 | P1 | 62 |
|  | 18 | X18 | A7 | 20 | B2 | 100 | B5 | 43 | C1 | 50 | P1 | 62 |
|  | 19 | X19 | A7 | 20 | B3 | 100 | B5 | 43 | C1 | 50 | P1 | 62 |
|  | 20 | X20 | A7 | 20 | B4 | 100 | B5 | 43 | C1 | 50 | P1 | 62 |
|  | 21 | X21 | A7 | 20 | B1 | 100 | B5 | 43 | C2 (note 7) | 38 | P1 | 62 |
|  | 22 | X22 | A7 | 20 | B1 | 100 | B5 | 43 | C1 | 50 | P2 | 62 |
|  | 23 | X23 | A23 | 20 | B1 | 100 | B5 | 43 | C1 | 50 | P1 | 62 |
|  | 24 | X24 | A24 | 20 | B1 | 100 | B5 | 43 | C1 | 50 | P1 | 62 |
|  | 25 | X25 | A25 | 20 | B1 | 100 | B5 | 43 | C1 | 50 | P1 | 62 |
|  | 26 | X26 | A26 | 20 | B1 | 100 | B5 | 43 | C1 | 50 | P1 | 62 |
|  | 27 | X27 | A27 | 20 | B1 | 100 | B5 | 43 | C1 | 50 | P1 | 62 |
|  | 28 | X28 | A28 | 20 | B1 | 100 | B5 | 43 | C1 | 50 | P1 | 62 |
|  | 29 | X29 | A29 | 20 | B1 | 100 | B5 | 43 | C1 | 50 | P1 | 62 |
|  | 30 | X30 | A30 | 20 | B1 | 100 | B5 | 43 | C1 | 50 | P1 | 62 |
|  | 31 | X31 | A31 | 20 | B1 | 100 | B5 | 43 | C1 | 50 | P1 | 62 |
|  | 32 | X32 | A32 | 20 | B1 | 100 | B5 | 43 | C1 | 50 | P1 | 62 |
|  | 33 | X33 | A33 | 20 | B1 | 100 | B5 | 43 | C1 | 50 | P1 | 62 |
|  | 34 | X34 | A34 | 20 | B1 | 100 | B5 | 43 | C1 | 50 | P1 | 62 |
|  | 35 | X35 | A29 | 20 | B2 | 100 | B5 | 43 | C1 | 50 | P1 | 62 |
|  | 36 | X36 | A29 | 20 | B3 | 100 | B5 | 43 | C1 | 50 | P1 | 62 |
|  | 37 | X37 | A29 | 20 | B4 | 100 | B5 | 43 | C1 | 50 | P1 | 62 |
|  | 38 | X38 | A29 | 20 | B1 | 100 | B5 | 43 | C2 (note 7) | 38 | P1 | 62 |
|  | 39 | X39 | A29 | 20 | B1 | 100 | B5 | 43 | C1 | 50 | P2 | 62 |
| Comparative Example | 1 | X40 | A18 | 20 | B1 | 100 | B5 | 43 | C1 | 50 | P1 | 62 |
|  | 2 | X41 | A19 | 20 | B1 | 100 | B5 | 43 | C1 | 50 | P1 | 62 |
|  | 3 | X42 | A20 | 20 | B1 | 100 | B5 | 43 | C1 | 50 | P1 | 62 |
|  | 4 | X43 | A21 | 20 | B1 | 100 | B5 | 43 | C1 | 50 | P1 | 62 |
|  | 5 | X44 | A22 | 20 | B1 | 100 | B5 | 43 | C1 | 50 | P1 | 62 |
|  | 6 | X45 |  |  | B1 | 100 | B5 | 57 | C1 | 50 | P1 | 62 |
|  | 7 | X46 | A7 | 20 | B1 | 100 | B5 | 43 | C3 (note 8) | 38 | P1 | 62 |
|  | 8 | X47 | A35 | 20 | B1 | 100 | B5 | 43 | C1 | 50 | P1 | 62 |
|  | 9 | X48 | A36 | 20 | B1 | 100 | B5 | 43 | C1 | 50 | P1 | 62 |
|  | 10 | X49 | A37 | 20 | B1 | 100 | B5 | 43 | C1 | 50 | P1 | 62 |
|  | 11 | X50 | A38 | 20 | B1 | 100 | B5 | 43 | C1 | 50 | P1 | 62 |
|  | 12 | X51 | A39 | 20 | B1 | 100 | B5 | 43 | C1 | 50 | P1 | 62 |
|  | 13 | X52 |  |  | B1 | 100 | B5 | 57 | C1 | 50 | P1 | 62 |
|  | 14 | X53 | A29 | 20 | B1 | 100 | B5 | 43 | C3 (note 8) | 38 | P1 | 62 |

(note 7) Melamine resin (C2): methyl-butyl mixed-etherified melamine resin, solid content 80%, weight-average molecular weight, 1,200
(note 8) Melamine resin (C3): methyl-etherified melamine resin, solid content 80%, weight-average molecular weight, 800

Coating Film-Forming Method (Preparation of Test Panels)

Test panels were prepared in the following manner, respectively of the water-based paint compositions (X1)-(X-29) which were obtained in above Examples 1-22 and Comparative Examples 1-7.

(Preparation of Test Coating Object)

Onto cold-rolled steel sheets which had been given a zinc phosphate treatment, ELECRON GT-10 (tradename, Kansai Paint Co., a thermosetting epoxy resin type cationic electrodeposition paint) was electrocoated to a cured film thickness of 20 μm, and dried at 170° C. for 30 minutes to be cured. Thereafter an intermediate paint, AMILAC TP-65-2 (tradename, Kansai Paint Co., polyester resin-amino resin type organic solvent-based intermediate paint) was applied to a cured film thickness of 40 μm, followed by curing by heating at 140° C. for 30 minutes, to provide the test coating object.

Example 40

In a coating atmosphere of 23° C. and 75% RH, the water-based paint composition (X1) as obtained in Example 1 was coated onto the above test coating object with a rotary atomizing type bell-formed coater, to a cured film thickness of 15 μm, left standing for 2 minutes, and preheated at 80° C. for 3 minutes. Then onto the uncured coated surface, MAGICRON KINO-1210 (tradename, Kansai Paint Co., an acrylic resin type solvent-based top clear paint) was applied to a cured film thickness of 35 μm and left standing for 7 minutes. Thereafter the two coating films were simultaneously cured by heating at 140° C. for 30 minutes to provide a test panel.

Examples 41-61, Comparative Examples 15-21

Test panels of Examples 41-61 and Comparative Examples 15-21 were prepared in the manner similar to Example 40, except that the water-based paint composition (X1) used in Example 40 was replaced with the water-based paint compositions as shown in the following Table 4.

Evaluation Tests

Each of the test panels as obtained in Examples 40-61 and Comparative Examples 15-21 was evaluated by the following test methods. The results of the evaluation are shown in Table 4.

(Test Methods)

Smoothness:

Smoothness was evaluated, using Long Wave (LW) values measured with WAVE SCAN (tradename, BYK Gardner Co.). Long Wave (LW) value is an index of the amplitude of surface roughness of the wavelengths ranging around 1.2-12 mm. The less the measured value, the higher the smoothness of the coated surface.

Distinctness of Image:

Distinctness of image was evaluated, using Short Wave (SW) values measured with above WAVE SCAN. Short WAVE (SW) value is an index of the amplitude of surface roughness of the wavelengths ranging around 0.3-1.2 mm. The less the measured value, the better the distinctness of image of the coated surface.

Water Resistance:

The test panels were immersed in 40° C. warm water for 240 hours, withdrawn and dried at 20° C. for 12 hours. The multilayer coating film on each test panel was crosscut with a cutter to the depth reaching the substrate, to form one-hundred 2 mm×2 mm squares. Then an adhesive cellophane tape was stuck thereon, and rapidly peeled off at 20° C. The residual condition of the coating film squares was examined.

⊙: One-hundred squares of the coating film remained, and no minor peeling occurred at the cutting edges with the cutter.

○: One-hundred squares of the coating film remained, but minor peeling of the coating film occurred at the cutting edges with the cutter.

Δ: Remaining number of the squares was 90-99.

x: Remaining number of the squares was not more than 89.

TABLE 4

| | | Water-based paint Composition | Evaluation Result | | |
|---|---|---|---|---|---|
| | | | smoothness | distinctness of image | water resistance |
| Example | 40 | X1 | 6.5 | 5.0 | ⊙ |
| | 41 | X2 | 6.9 | 5.3 | ⊙ |
| | 42 | X3 | 6.1 | 5.0 | ⊙ |
| | 43 | X4 | 6.0 | 5.0 | ⊙ |
| | 44 | X5 | 5.5 | 5.0 | ○ |
| | 45 | X6 | 5.5 | 5.5 | ⊙ |
| | 46 | X7 | 5.0 | 4.5 | ⊙ |
| | 47 | X8 | 5.2 | 4.7 | ⊙ |
| | 48 | X9 | 5.5 | 5.0 | ⊙ |
| | 49 | X10 | 5.7 | 6.9 | ○ |
| | 50 | X11 | 5.1 | 4.7 | ⊙ |
| | 51 | X12 | 5.6 | 5.1 | ⊙ |
| | 52 | X13 | 5.9 | 5.3 | ⊙ |
| | 53 | X14 | 9.0 | 7.5 | ○ |
| | 54 | X15 | 8.2 | 7.3 | ○ |
| | 55 | X16 | 8.3 | 7.4 | ○ |
| | 56 | X17 | 8.5 | 7.5 | ○ |
| | 57 | X18 | 5.1 | 4.6 | ⊙ |
| | 58 | X19 | 5.5 | 5.0 | ⊙ |
| | 59 | X20 | 6.0 | 5.0 | ⊙ |
| | 60 | X21 | 5.0 | 4.5 | ○ |
| | 61 | X22 | 6.0 | 6.5 | ⊙ |
| Comparative Example | 15 | X40 | 13.0 | 11.0 | Δ |
| | 16 | X41 | 9.0 | 10.0 | X |
| | 17 | X42 | 6.0 | 7.5 | X |
| | 18 | X43 | 11.0 | 12.0 | ○ |
| | 19 | X44 | 10.8 | 10.3 | ○ |
| | 20 | X45 | 13.0 | 10.0 | ○ |
| | 21 | X46 | 6.0 | 5.5 | Δ |

Example 62

In a coating atmosphere of 23° C. and 75% RH, the water-based paint composition (X23) as obtained in Example 23 was applied onto the test coating object with a rotary atomizing type bell-formed coater, to a cured film thickness of 15 μm, left standing for 2 minutes and preheated at 80° C. for 3 minutes. Then onto the uncured coated surface MAGICRON KINO-1210 (tradename, Kansai Paint Co., acrylic resin type solvent-based top clear paint) was applied to a cured film thickness of 45 μm and left standing for 7 minutes. Thereafter the two coating films were simultaneously cured by heating at 140° C. for 30 minutes, to provide a test panel.

Examples 63-78, Comparative Examples 22-28

Test panels of Examples 63-78 and Comparative Examples 22-28 were prepared in the manner similar to Example 62, except that the water-based paint composition (X23) used in Example 62 was replaced with the water-based paint compositions as shown in the following Table 5.

Evaluation Tests

Test panels as obtained in Examples 62-78 and Comparative Examples 22-28 were evaluated by the above test methods. The results of the evaluation are shown in the following Table 5.

TABLE 5

|  | | Water-based paint Composition | Evaluation Result | | |
|---|---|---|---|---|---|
|  | | | smoothness | distinctness of image | water resistance |
| Example | 62 | X23 | 7.1 | 5.2 | ⊙ |
|  | 63 | X24 | 7.3 | 5.4 | ⊙ |
|  | 64 | X25 | 6.9 | 5.2 | ⊙ |
|  | 65 | X26 | 6.1 | 5.2 | ⊙ |
|  | 66 | X27 | 5.5 | 5.0 | ○ |
|  | 67 | X28 | 5.6 | 5.5 | ⊙ |
|  | 68 | X29 | 5.1 | 4.5 | ⊙ |
|  | 69 | X30 | 5.5 | 5.0 | ⊙ |
|  | 70 | X31 | 5.7 | 6.9 | ○ |
|  | 71 | X32 | 6.4 | 5.3 | ⊙ |
|  | 72 | X33 | 6.3 | 5.2 | ⊙ |
|  | 73 | X34 | 6.5 | 5.5 | ⊙ |
|  | 74 | X35 | 5.1 | 4.6 | ⊙ |
|  | 75 | X36 | 5.5 | 5.0 | ⊙ |
|  | 76 | X37 | 6.0 | 5.0 | ⊙ |
|  | 77 | X38 | 5.0 | 4.5 | ○ |
|  | 78 | X39 | 6.0 | 6.5 | ⊙ |
| Comparative Example | 22 | X47 | 12.9 | 10.8 | Δ |
|  | 23 | X48 | 8.9 | 10.0 | X |
|  | 24 | X49 | 5.9 | 7.5 | X |
|  | 25 | X50 | 11.0 | 11.9 | ○ |
|  | 26 | X51 | 10.8 | 10.1 | ○ |
|  | 27 | X52 | 12.8 | 10.0 | ○ |
|  | 28 | X53 | 5.9 | 5.5 | Δ |

The invention claimed is:

1. A water-based paint composition comprising
(A) a copolymer of (a) polymerizable unsaturated monomer having polyoxyalkylene chain, (b) hydroxyl-containing polymerizable unsaturated monomer having no polyoxyalkylene chain, (c) polymerizable unsaturated monomer having at least one cationic functional group selected from the group consisting of tertiary amino groups and quaternary ammonium salt groups, (d) at least one monomer selected from the group consisting of (d-1) bridged alicyclic hydrocarbon group-containing polymerizable unsaturated monomers and (d-2) $C_{6-18}$ alkyl or cycloalkyl group-containing polymerizable unsaturated monomers and (e) a polymerizable unsaturated monomer other than monomers (a)-(d),
(B) a water-dispersible acrylic resin having a core/shell multilayer structure comprising a core of copolymer (I) obtained by copolymerizing 0.1-30 mass % of polymerizable unsaturated monomer (h) having at least two polymerizable unsaturated groups per molecule and 70-99.9 mass % of polymerizable unsaturated monomer (i) having one polymerizable unsaturated group per molecule; and a shell of copolymer (II) obtained by copolymerizing 1-35 mass % of hydroxyl-containing polymerizable unsaturated monomer (f), 5-60 mass % of hydrophobic polymerizable unsaturated monomer (j) and 5-94 mass % of polymerizable unsaturated monomer (k) other than the hydroxyl-containing polymerizable unsaturated monomer (f) and hydrophobic polymerizable unsaturated monomer (j), and the solid mass ratio of the copolymer (I)/copolymer (II) is within the range of 10/90-90/10, and
(C) melamine resin having a weight-average molecular weight within the range of 1,000-5,000.

2. The water-based paint composition according to claim 1, in which the polymerizable unsaturated monomer (a) having polyoxyalkylene chain is a compound represented by formula (1)

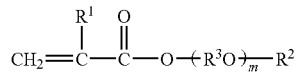

wherein $R^1$ stands for hydrogen or methyl, $R^2$ stands for hydrogen or $C_{1-4}$ alkyl, $R^3$ stands for $C_{2-4}$ alkylene, m is an integer of 3-150 and m oxyalkylene units ($R^3O$)s may be the same or different.

3. The water-based paint composition according to claim 1, in which the hydroxyl-containing polymerizable unsaturated monomer (b) having no polyoxyalkylene chain is selected from the group consisting of 2-hydroxyethyl (meth)acrylate, 2-hydroxypropyl (meth)acrylate, 3-hydroxypropyl (meth)acrylate and 4-hydroxybutyl (meth)acrylate.

4. The water-based paint composition according to claim 1, in which the cationic functional group-containing polymerizable unsaturated monomer (c) is a combination of tertiary amino group-containing polymerizable unsaturated monomer (c-1) and quaternary ammonium salt group-containing polymerizable unsaturated monomer (c-2).

5. The water-based paint composition according to claim 1, in which the polymerizable unsaturated monomer (d) contains bridged alicyclic hydrocarbon group-containing polymerizable unsaturated monomer (d-1).

6. The water-based paint composition according to claim 1, in which the other polymerizable unsaturated monomer (e) contains styrene.

7. The water-based paint composition according to claim 1, in which the copolymer (A) is a copolymer obtained by copolymerizing 5-40 mass % of (a) polymerizable unsaturated monomer having polyoxyalkylene chain, 5-40 mass % of (b) hydroxyl-containing polymerizable unsaturated monomer having no polyoxyalkylene chain, 1-15 mass % of (c) polymerizable unsaturated monomer having at least one cationic functional group selected from tertiary amino groups and quaternary ammonium salt groups, 1-50 mass % of at least one polymerizable unsaturated monomer (d) which is selected from the group consisting of (d-1) bridged alicyclic hydrocarbon group-containing polymerizable unsaturated monomers and (d-2) $C_{6-18}$ alkyl group-containing polymerizable unsaturated monomers, and 1-88 mass % of (e) polymerizable unsaturated monomer other than the foregoing monomers, based on the total amount of the monomers (a)-(e).

8. The water-based paint composition according to claim 1, which further contains a hydroxyl-containing polyester resin (B-2).

9. The water-based paint composition according to claim 8, in which the water-dispersible acrylic resin (B) has amido groups.

10. The water-based paint composition according to claim 1, in which the polymerizable unsaturated monomer (h) having at least two polymerizable unsaturated groups per molecule has an amido group.

11. The water-based paint composition according to claim 1, in which the hydrophobic polymerizable unsaturated monomer (j) is a vinyl aromatic compound.

12. The water-based paint composition according to claim 1, in which the polymerizable unsaturated monomer (k) is a carboxyl-containing polymerizable unsaturated monomer (l), or the polymerizable unsaturated monomer (k) consists of at least two polymerizable unsaturated monomers other than the hydroxyl-containing polymerizable unsaturated monomer (f) and the hydrophobic polymerizable unsaturated monomer (j), one of which is a carboxyl-containing polymerizable unsaturated monomer (l), wherein the content of the carboxyl-containing polymerizable unsaturated monomer (l) is 1-40 mass % based on the total mass of the monomers (f), (j) and (k).

13. The water-based paint composition according to claim 1, in which the melamine resin (C) is an alkyl-etherified melamine resin.

14. The water-based paint composition according to claim 1, which contains 1-50 mass parts of the copolymer (A), 20-90 mass parts of the water-dispersible acrylic resin (B) and 5-50 mass parts of the melamine resin (C), per 100 mass parts of the total solid resin content of the components (A), (B) and (C).

15. The water-based paint composition according to claim 1, which further contains a hydrophobic solvent (D).

16. The water-based paint composition according to claim 15, in which the hydrophobic solvent (D) is an alcoholic hydrophobic solvent.

17. An article coated with a water-based paint composition according to any one of claims 1-9 and 10-16.

18. A method of forming a multilayer coating film onto a coating object, comprising:
applying a water-based paint composition according to any one of claims 1-9 and 10-16 onto a coating object to obtain an uncured coating film on the coating object,
applying onto the uncured coating film a clear paint, and
curing the uncured coating film and clear paint simultaneously by heating.

19. An object coated by the method according to claim 18.

* * * * *